US005503546A

United States Patent [19]

Aaseth et al.

[11] Patent Number: 5,503,546

[45] Date of Patent: Apr. 2, 1996

[54] APPARATUS FOR FORMING CONCRETE PRODUCTS

[75] Inventors: Allen Aaseth, Woodland; Robert A. Schmitt, Vancouver, both of Wash.

[73] Assignee: Columbia Machine, Inc., Vancouver, Wash.

[21] Appl. No.: 282,042

[22] Filed: Jul. 28, 1994

Related U.S. Application Data

[62] Division of Ser. No. 193,272, Feb. 7, 1994, Pat. No. 5,395, 228.

[51] Int. Cl.[6] .......... B29C 45/18

[52] U.S. Cl. .......... 425/258; 425/260

[58] Field of Search .......... 425/258, 260

[56] References Cited

U.S. PATENT DOCUMENTS

| | | | |
|---|---|---|---|
| 1,000,089 | 8/1911 | Haas . | |
| 1,004,327 | 9/1911 | Williams . | |
| 2,396,999 | 3/1946 | George . | |
| 2,566,787 | 9/1951 | Zevely . | |
| 2,586,210 | 2/1952 | Corwin . | |
| 2,589,115 | 3/1952 | Nelson et al. | 425/432 |
| 2,706,320 | 4/1955 | Davies et al. | 425/432 |
| 2,819,046 | 1/1958 | Jandris et al. | 425/432 |
| 2,831,230 | 4/1958 | Neth et al. . | |
| 2,842,827 | 7/1958 | Nickelson | 425/432 |
| 2,859,502 | 11/1958 | Brown, Jr. | 425/432 |
| 2,985,935 | 5/1961 | Wellnitz | 425/432 |
| 3,277,551 | 10/1966 | Sekiguchi . | |

(List continued on next page.)

FOREIGN PATENT DOCUMENTS

| | | |
|---|---|---|
| 2493214 | 9/1981 | France . |
| 2478519 | 5/1982 | France . |

OTHER PUBLICATIONS

Columbia Machine, Inc. Bulletin, "Model 15 1½ Block Machine", 1982.

Columbia Machine, Inc. Bulletin, "Model 16 HF Floor–Level 3–Block Machine", 1991.

Columbia Machine, Inc. Bulletin, "Model 22 HF Floor–Level Block Machine", 1991.

Columbia Machine, Inc. Bulletin, "Model 50 Block Machine", 1993.

Columbia Machine, Inc. Bulletin, "Model 60 Block Machine", no date.

Columbia Machine, Inc. Bulletin, "Model 180 Paver Machine", no date.

Columbia Machine, Inc. Bulletin, "Model 1600 Block Machine", 1986.

Columbia Machine, Inc. Bulletin, "Mold Alignment Device", 1991.

Columbia Machine, Inc. Bulletin, "Model 30 3–block Machine", NGL Mar. 1988 (no date).

*Primary Examiner*—Tim Heitbrink

*Attorney, Agent, or Firm*—Marger, Johnson, McCollom & Stolowitz

[57] ABSTRACT

A mold box is flexibly mounted to a product forming machine having upper and lower vertically displaceable beams. A feed drawer dispenses concrete material into the mold box while a vibration system vertically vibrates the mold box while dampening horizontal vibration. The vibration system is driven by a single drive shaft that actuates first and second vibrator rods while at the same time rotating a counter-weight in a counter-rotating direction. A set of alignment brackets lock the mold box into a predetermined aligned relationship while being mounted in the product forming machine. The bottom side of each mold box is mounted to the product forming machine in the same relative position to reduce machine readjustments. A set of telescoping legs hold the feed drawer assembly variable distances above the mold box. A unitized pallet feeder quickly moves pallets one at a time from an "on-deck" position to a "receiving" position underneath the mold box.

11 Claims, 16 Drawing Sheets

U.S. PATENT DOCUMENTS

| | | | |
|---|---|---|---|
| 3,331,112 | 7/1967 | Clanton et al. | 425/448 |
| 3,343,239 | 9/1967 | Davies . | |
| 3,659,986 | 5/1972 | Gelbman | 425/88 |
| 3,712,785 | 1/1973 | Hirt et al. | 425/405 |
| 4,111,627 | 9/1978 | Kitahara | 425/421 |
| 4,193,754 | 3/1980 | Sekiguchi | 425/424 |
| 4,238,177 | 12/1980 | Crile et al. | 425/432 |
| 4,265,609 | 5/1981 | Kitahara | 425/260 |
| 4,395,213 | 7/1983 | Springs et al. . | |
| 4,445,839 | 5/1984 | Crane | 425/432 |
| 5,059,110 | 10/1991 | Allison et al. | 424/260 |
| 5,219,591 | 6/1993 | Allison et al. | 425/260 |
| 5,256,053 | 10/1993 | Haguchi | 425/258 |

APPARATUS FOR FORMING CONCRETE PRODUCTS

This is a division of commonly signed application Ser. No. 08/193,272 filed Feb. 7, 1994, now U.S. Pat. No. 5,395,228.

BACKGROUND OF THE INVENTION

This invention relates generally to cement product making machinery and more particularly to a method and apparatus for high speed manufacturing of a wide variety of high quality products.

Prior art machines for forming concrete products include a product forming section comprising a stationary frame, an upper compression beam and a lower stripper beam. A mold box has a head assembly which is mounted on the compression beam, and a mold assembly which is mounted on the frame and receives concrete material from a feed drawer. A conveyer system feeds metal pallets to the product forming section.

The head assembly raises above the mold assembly when the compression beam moves vertically upward into a raised position. After the compression beam raises, the stripper beam raises thereby placing a pallet against a bottom side of the mold assembly. The pallet seals the bottom side of cavities in the mold assembly. The feed drawer moves concrete material over the top of the mold assembly and dispenses the material into the contoured cavities.

As the concrete material is dispensed, a vibration system shakes the mold assembly. The vibration system spreads the concrete material evenly within the mold assembly cavities to produce a more homogeneous concrete product.

After the concrete is dispensed into the mold cavities, the feed drawer retracts from over the top of the mold assembly. The compression beam lowers pushing shoes from the head assembly into corresponding cavities in the mold assembly. The shoes compress the concrete material. After compression is complete, the stripper beam lowers as the head assembly pushes further into the cavities against the molded material. A molded concrete product thereby emerges from the bottom of the mold assembly onto the pallet. The pallet then moves via conveyer from the product forming section.

Several problems occur with the above stated product forming process. As the vibrator system shakes the mold assembly, the rest of the product forming machine also shakes. Machine vibration tends to dampen vibration in the mold assembly. Thus, concrete material in the mold box does not spread evenly in the mold assembly. Machine vibration also fatigues machine parts and alters the clearances between the head assembly and mold assembly. Thus, machine and mold box operating life is reduced and product quality is limited and furthermore deteriorates with machine use.

Mold boxes of various sizes are constantly exchanged in the product forming machine to produce different product shapes. When a new mold box is mounted in the machine, the various moving parts of the machine such as attachments to the compression and stripper beams, must be realigned. Realignment is necessary so that the machine can properly engage mold boxes of different heights. The head assembly and the mold assembly must also be jimmied until properly aligned together. Thus, a significant amount of time is required to properly mount and align a new mold box in the product forming machine. Machine down time while changing mold boxes reduces overall product output.

Pallets are located in a receiving position under the mold assembly by pushing pallets end-to-end. Sliding the pallets into a receiving position incurs wear on the pallet and increases the overall cycle time of the machine. For example, the time required to push a pallet into the receiving position increases because the pallet speed must be slowed down as the pallet approaches the receiving position.

Further, as the feed drawer dispenses concrete material into the mold assembly, a certain amount of concrete material accumulates on the topside of the mold assembly. As concrete further accumulates on the front edge, concrete material begins to spill off a front edge of the mold assembly.

Accordingly, a need remains for a high output concrete product forming machine that produces a wide variety of high quality products.

SUMMARY OF THE INVENTION

It is, therefore, an object of the invention to increase vibration control in a cement product forming machine.

Another object of the invention is to reduce the amount of time required to mold cement products.

Another object of the invention is to increase the homogeneous consistency of cement products.

Yet another object of the invention is to reduce the amount of time required to exchange and align molds in a cement product forming machine.

An apparatus for forming concrete products comprises a frame for supporting various product forming components such as a vertically displaceable compression beam and a vertically displaceable stripper beam. A mold box having internal cavities contoured to define preselected product patterns is flexibly mounted to the frame. A feed drawer receives concrete material and dispenses the concrete material into the mold box cavities.

A vibration system vibrates the mold box without inducing any substantial vibration in the frame while at the same time reducing horizontal vibrational effects. The vibration system comprises a pair of spaced-apart, vertically extending vibrator rods connected at a top end to the mold box and at a bottom end to a drive means.

The drive means including a single drive shaft that actuates a vibrator unit that vibrates both the first and second vibrator rods while at the same time reducing frame vibration. The drive means also includes a gear box having a counter-rotating shaft for holding counter-weights. The shaft rotates the counter-weights offsetting vibration in the frame caused by the first and second vibrator units.

The mold box is mounted to the frame via spring steel plates. The plates are competed at opposite ends to the front and back sides of the frame. A center portion of the steel plates are coupled to the mold box via a vibration bracket. The vibration bracket includes a dowel that extends vertically up from a top surface to mate with a corresponding hole in the bottom of the mold box for automatically aligning the mold in a predetermined location in relation to the frame.

By reducing vibration in the frame and isolating vibration in the mold box, frame components are less likely to become misaligned. Thus, machine adjustments are preformed less often increasing the overall operating life of the product forming machine. The vibration system by reducing frame vibration also increases the effective mold box vibration in turn allowing concrete material to be spread more uniformly in the mold box.

The vibration system reduces vibration in the horizontal direction further reducing frame misalignments and at the same time allowing more precise mold box tolerances. For example, each mold box comprises a head assembly that inserts into a mold assembly. If the mold box is vibrated in a horizontal direction, the mold box assemblies must be spaced far enough apart so that the shoes on the head assembly do not bang against the internal cavities in the mold assembly. By reducing horizontal vibration, mold box assemblies can be designed to engage at closer distances allowing more detailed product designs and more effective compression and stripping processes creating higher quality concrete (e.g., blocks).

As previously mentioned, the mold box comprises a head assembly having multiple shoes that are insertable into associated cavities in a mold assembly. The mold box is mounted to the frame by bolting the head assembly to the compression beam and bolting the mold assembly to the frame. The novel alignment brackets lock the head assembly and the mold assembly into a predetermined aligned relationship. While the head assembly and mold assembly are bolted together, the mold box is then mounted to the frame. The alignment brackets allow the mold box to be mounted while maintaining the predetermined aligned position. After the alignment brackets are removed, the product forming machine moves the upper head assembly and the mold assembly in vertical directions up and down while maintaining the same predetermined aligned relationship.

The frame includes novel mounting means for mounting the mold box to the frame. The vibration bracket includes a shelf that holds the bottom side of the mold assembly in a predetermined position in relation to the frame. The bottom side mounting of the mold box allows alternative mold boxes having different heights to be attachable at the same predetermined positional relationship on the frame. Thus, the time required to exchange mold boxes is reduced.

The feed drawer assembly is held above the ground by telescoping legs each having an interior tube that is vertically displaceable inside an associated exterior tube. Jack screws attached to the feed drawer assembly move the inner tube of each telescoping leg up and down. A drive motor synchronously rotates each jack screw in the same direction and at the same speed thereby controlling vertical displacement of the feed drawer assembly.

Air-bag activated locks are used to lock each telescoping leg into a given vertical position transferring weight from the jack screws. Each air lock includes a puck that extends through a hole in the exterior tube. When the air-bag actuates, the puck clamps against the inner tube locking the telescoping leg in a given vertical position.

The feed drawer assembly includes a brush that removes concrete material from the head assembly shoes while the compression beam is in a raised position. The feed drawer also includes a horizontally displaceable wiper blade that scrapes concrete material from the top of the mold assembly into the internal cavities of the mold assembly. The wiper blade prevents concrete material from accumulating and falling off the front edge of the mold box.

The concrete products are formed and carried on metal pallets. The concrete block forming machine includes a pallet feeder that individually moves the pallets in a unitized fashion underneath the mold box. The pallet feeder includes an infeed rack for locating pallets under the mold box and an outfeed rack, located adjacent to the infeed rack, for moving the pallets from underneath the mold box to a conveyer. An arm pivotally coupled to the frame slides the pallet feeder back and fourth. The arm oscillates back and forth in a 180 degree rotation about a vertically aligned axis.

A vertically displaceable conveyer transfers pallets onto the pallet feeder infeed rack. The stripper beam then lifts the pallets from the infeed rack to a position up against the underside of the mold assembly. After concrete products have been formed and placed on the pallet, the stripper beam lowers the pallet down onto the outfeed rack. The outfeed rack then removes the pallet from under the mold box.

The pallet feeder allows pallets to be moved quickly into position underneath the mold box reducing the overall cycle time of the concrete product forming machine. By carrying pallets both underneath and away from the mold box, the machine precisely controls pallet positioning. Carrying the pallets also reduces pallet wear over systems that simply push pallets underneath the mold box.

The compression beam and the stripper beam are operated together and separately to reduce overall machine cycle time and to increase the quality of the formed products. The novel hydraulic piston operation ensures that both the compression and stripper beams move at precise speeds in relation to each other.

The foregoing and other objects, features and advantages of the invention will become more readily apparent from the following detailed description of a preferred embodiment of the invention which proceeds with reference to the accompanying drawings.

DETAILED DESCRIPTION

Figure 1:
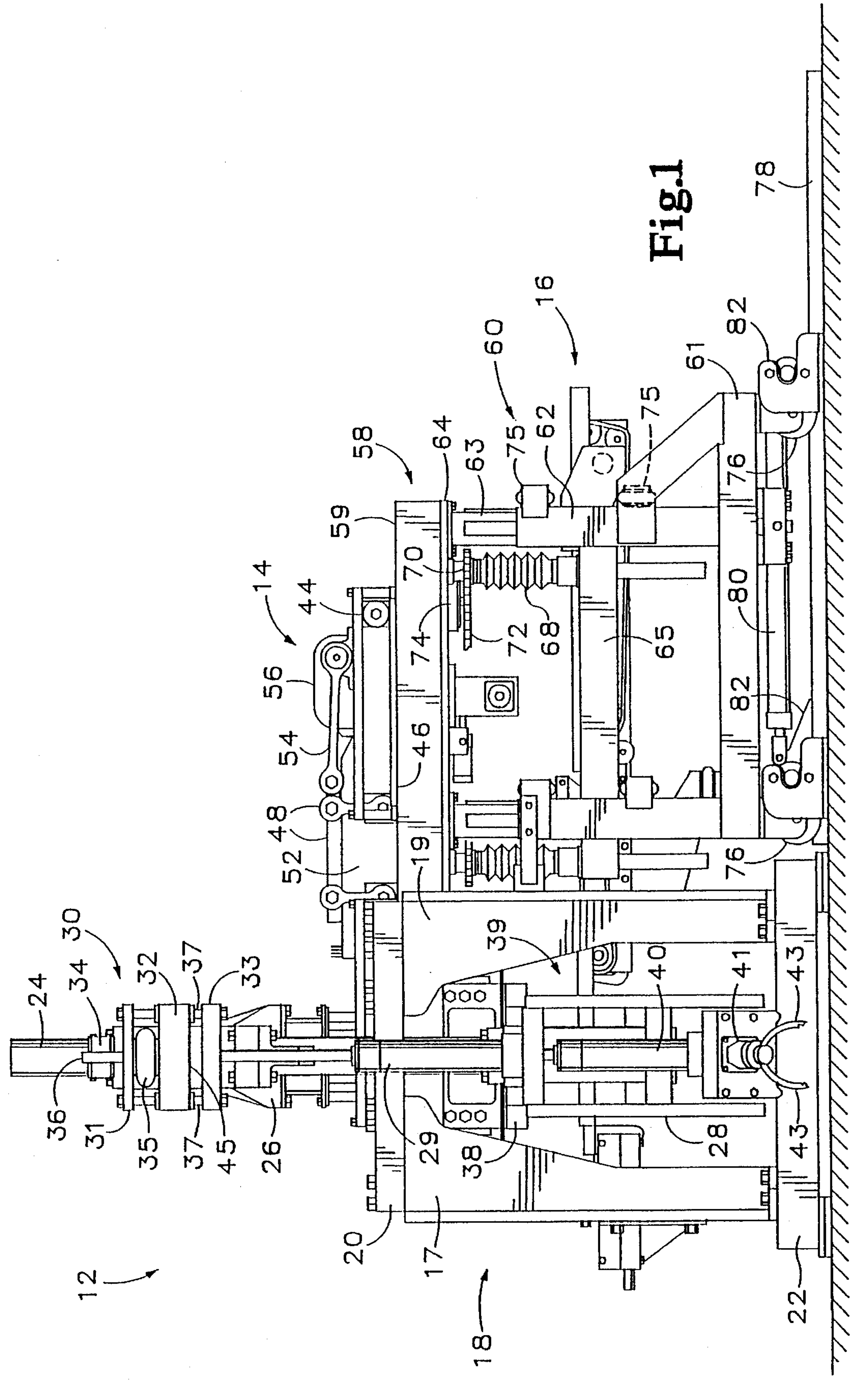
FIG. 1 is a side elevation of a product forming machine according to present invention, showing a product forming section joined on the right by both a feed drawer assembly and a vertically displaceable conveyer product.

FIG. 1 is a side elevation of a cement product forming machine according to the present invention, showing a product forming section 12 joined on the right by both a feed drawer assembly 14 and a conveyer 16. The product forming section 12 includes a frame 18 having front and back frame supports, 17 and 19, respectively. The frame supports are each joined together at a top end by a guide bar 20 and at a bottom end by a base section 22. A pair of frame supports 17 and 19 are located on each side of the frame 18. A vertically aligned guide shaft 24 is supported at a bottom end by base 22 and slideably coupled to both a compression beam 26 and a stripper beam 28. The stripper beam 28 and the compression beam 26 are described in more detail below in FIGS. 2 and 3.

It should be noted that the apparatus joined to the compression beam 26 and the stripper beam 28, as is now described, are substantially the same for each side of the product forming section 12 and operate in combination in substantially the same manner.

A compression piston 29 is attached at a top end to an attachment assembly 30. The attachment assembly includes a top plate 31 and a bottom plate 33 joined together by a pair of rods 37. Rods 37 are slidingly joined to a flange 32 extending laterally from a side of compression beam 26. A tab 36 is rigidly joined to the top plate 31 and is positioned between front and back portions of a disk brake 34. The disk brake 34 is rigidly joined to the compression beam 26. An air bag 35 is positioned between the top plate 31 and flange 32 and a hard plastic disk 45 is sandwiched between flange 32 and bottom plate 33.

A platform 38 extends across the top of stripper beam 28 and supports the compression piston 29. A stripper piston 40 rests on the base 22 of frame 18 and is joined at the top to the underside of platform 38. A hydraulic motor 41 is attached to a vibrator system (FIG. 3) and receives hydraulic fluid through lines 43.

The feed drawer assembly 14 includes a feed drawer 52 joined at a front and back end to wheels 44. The back wheels 44 ride on rail 46 allowing the feed drawer assembly 14 to move back and forth. A motor 56 is joined via a rotator arm 54 to agitator linkage 48.

The feed drawer assembly 14 is supported above the ground by a support frame 58 including four vertically aligned telescoping legs 60 each coupled at a top end to an opposite corner of a platform 64 and joined at a bottom end to a bottom beam 61. A pair of hollow top beams 59 are attached on the top of platform 64. Each telescoping leg 60 includes an exterior leg member 62 that receives an interior leg member 63. Four jack screws 68 are each joined at a bottom end to a side beam 65 and joined at a top end to platform 64. Each jack screw is driven by a sprocket 70 that is engaged via a chain 72 to a motor 74.

Two air locks 75 are attached to each telescoping leg 60. The bottom beam 61 is slidingly mounted on top of a rail 78 by wheels 76. A piston 80 is mounted to the floor at a front end via mount 82 and joined at a back end to the support frame 58. Piston 80 moves the feed drawer assembly 14, conveyer 16, and support frame 58 back and forth for maintenance and for changing molds. The conveyer 16 is described in detail below in FIG. 2.

Figure 2:
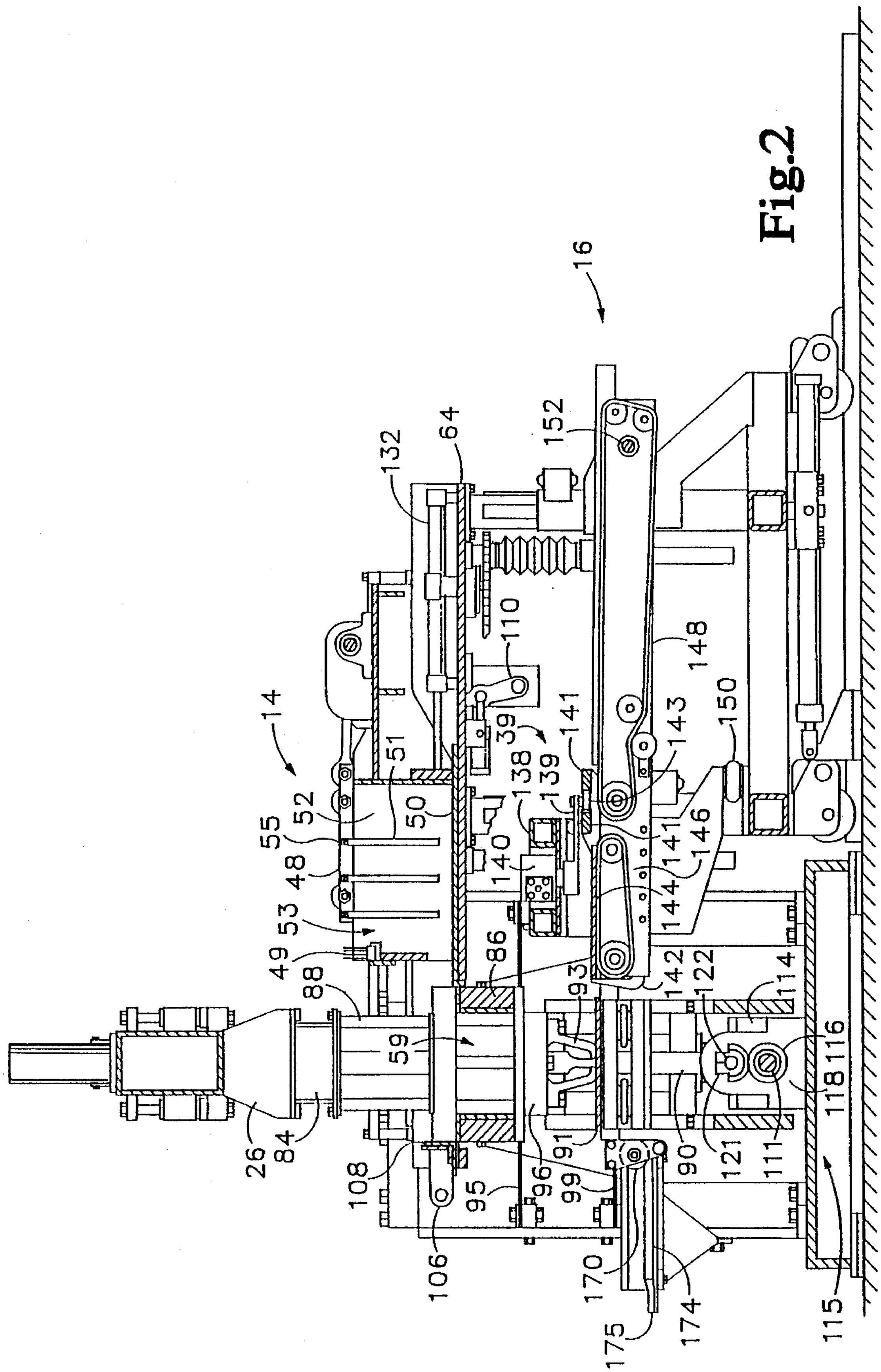
FIG. 2 is a side-section view of the product forming machine shown in FIG. 1.

FIG. 2 is a partially broken away side-section view of the product forming machine shown in FIG. 1. Conveyer 16 is shown in a raised position and pallet feeder 39 is shown in an "on-deck" position. A side-section of the feed drawer assembly 14 shows an internal cavity 53 inside feed drawer 52. The cavity 53 is covered at a bottom end by a slide plate 50 and receives vertically aligned agitator rods 51 through a top opening. The agitator rods 51 hang from dowels 55 attached to the sides of agitator linkage 48.

A piston 132 is mounted to the top of platform 64 and is attached at a front end to a back end of feed drawer 52. A wiper blade 108 is shown in a forward position at a front edge of a mold assembly 86. Wiper blade 108 is linked via arm 106 to pneumatically controlled lever 110 and will be described in detail below in FIG. 16. The compression beam 26 is joined at a bottom end to a head assembly 84 having shoes 88 extending downward. Shoes 88 are aligned to insert into corresponding cavities 89 in mold assembly 86.

A vibration system 115 includes an upper spring steel plate 95 bolted on opposite ends to front and back frame supports 17 and 19, respectively. Steel plate 95 is bolted in the center to a vibration bracket 93 and is shown in detail below in FIG. 7. A lower spring steel plate 99 is also bolted at opposite ends to front and back frame supports 17 and 19, respectively, and is bolted in the middle to the bottom of vibration bracket 93. A vibrator rod 90 extends from a vibrator unit 114 to the bottom of a shelf 96 extending from the top of vibration bracket 93. A gearbox 118 rotates a shaft 122 in the opposite direction of a drive shaft 111. A counterweight 121 is attached to shaft 122.

The conveyer 16 is shown in a raised position with a front end holding a pallet 144 above a back end of pallet feeder 39. The conveyer includes a front drive belt 146 and a rear drive belt 148 that move pallets from a back end to a front stop 142. An air bag 150 is shown in an inflated condition raising the front end of conveyer 16 above pallet feeder 39. When air bag 150 is deflated, conveyer 16 rotates about a pivot 152 lowering the front end of the conveyer and placing pallet 144 onto pallet feeder 39.

Support beams 138 extending transversely across opposites sides of the frame 18 and hold a motor 140 above pallet feeder 39. A drive arm 139 is attached at a first end to motor 140 and joined at a second end to a wheel 143. Wheel 143 is slidingly received between drive beams 141 located at the back end of the pallet feeder 39. A front end of pallet feeder 39 contains wheels 170 that ride along a rail 174. The front end of rail 174 slopes downward forming a ramp 175.

Figure 3:
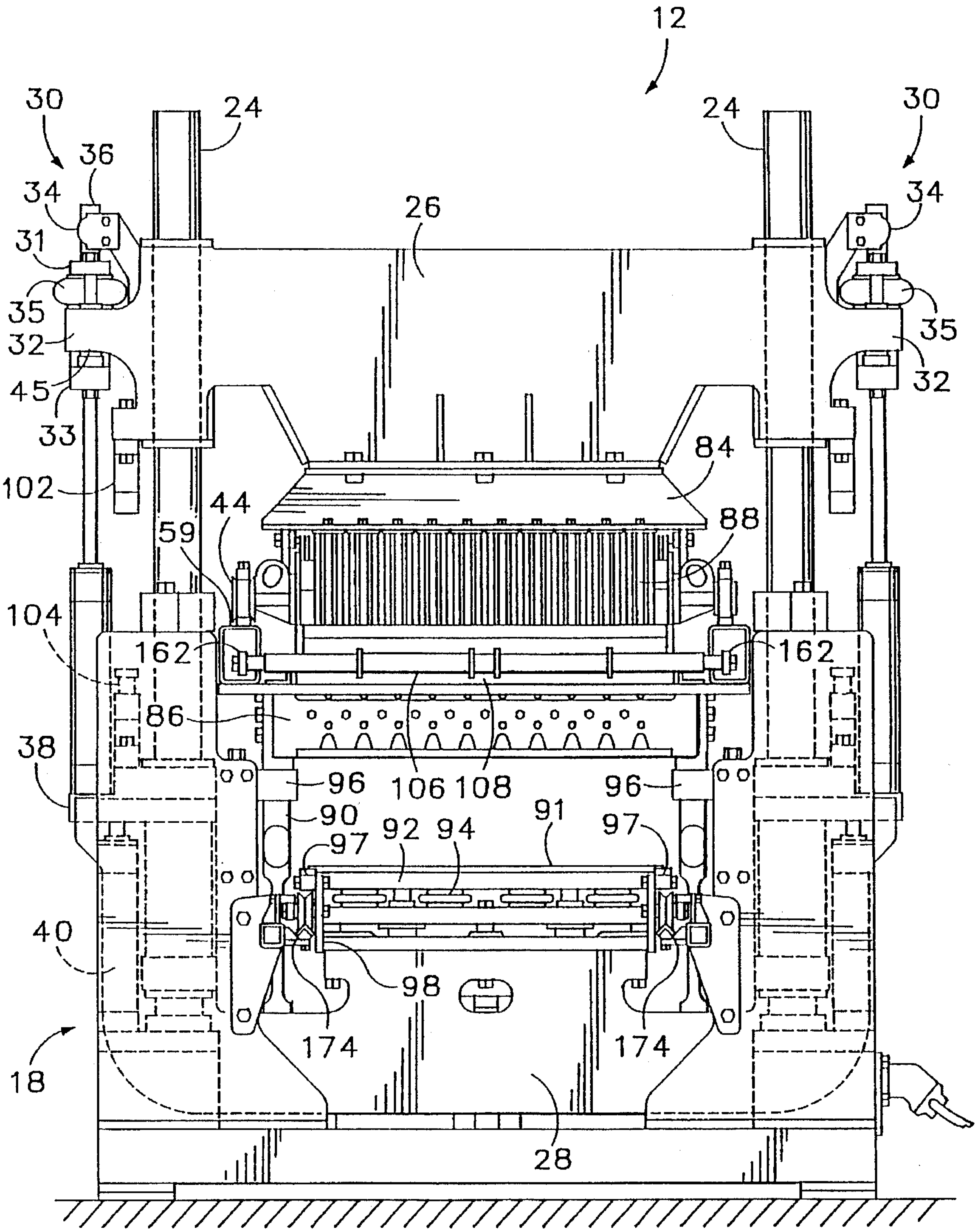
FIG. 3 is a front elevation of the product forming machine shown in FIG. 1 illustrating in detail the construction of the product forming section.

FIG. 3 is a front elevation of the product forming machine shown in FIG. 1 illustrating in detail the product forming section 12. The compression beam 26 is shown in a semi-lowered position and slides vertically along guide shaft 24. The head assembly 84, as described above, has downwardly directed shoes 88 that insert into corresponding cavities (not shown) in mold assembly 86. The mold assembly 86 is shown in detail in FIG. 8. The head assembly 84 is attached to the bottom of compression beam 26 and the mold assembly 86 is mounted on shelf 96 extending laterally from the top of vibration bracket 93 (see FIG. 7). The shelf 96 is joined at the bottom side to vibrator rod 90. Wiper blade 108 and arm 106 are positioned in front of shoes 88 and are attached at opposite ends to a pair of rods 162 that extend through top beams 59. The feed drawer assembly 14 is and is shown in a retracted position behind shoes 88 and includes wheels 44 attached at the front end.

A table 92 is attached via a set of air bags 94 to the top center portion of stripper beam 28. A front end of pallet feeder 39, previously shown in FIG. 1, and includes an outfeed rack 97. Is shown supporting a pallet 91 wheels 98 are attached to opposite lateral sides of pallet feeder 39 and run on rail 174 attached to opposite sides of frame 18.

The attachment assembly 30 is further shown with flange 32 of compression beam 26 extending between upper and lower plates 31 and 30, respectively. An upper height stop 102 is attached to each side of compression beam 26 and a lower height stop 104 is attached to the top of platform 38 of stripper beam 28. The guide shafts 24 slidingly extend through the sides of both compression beam 26 and stripper beam 28 serving as a guide for each beam when moved up and down.

Figure 4:
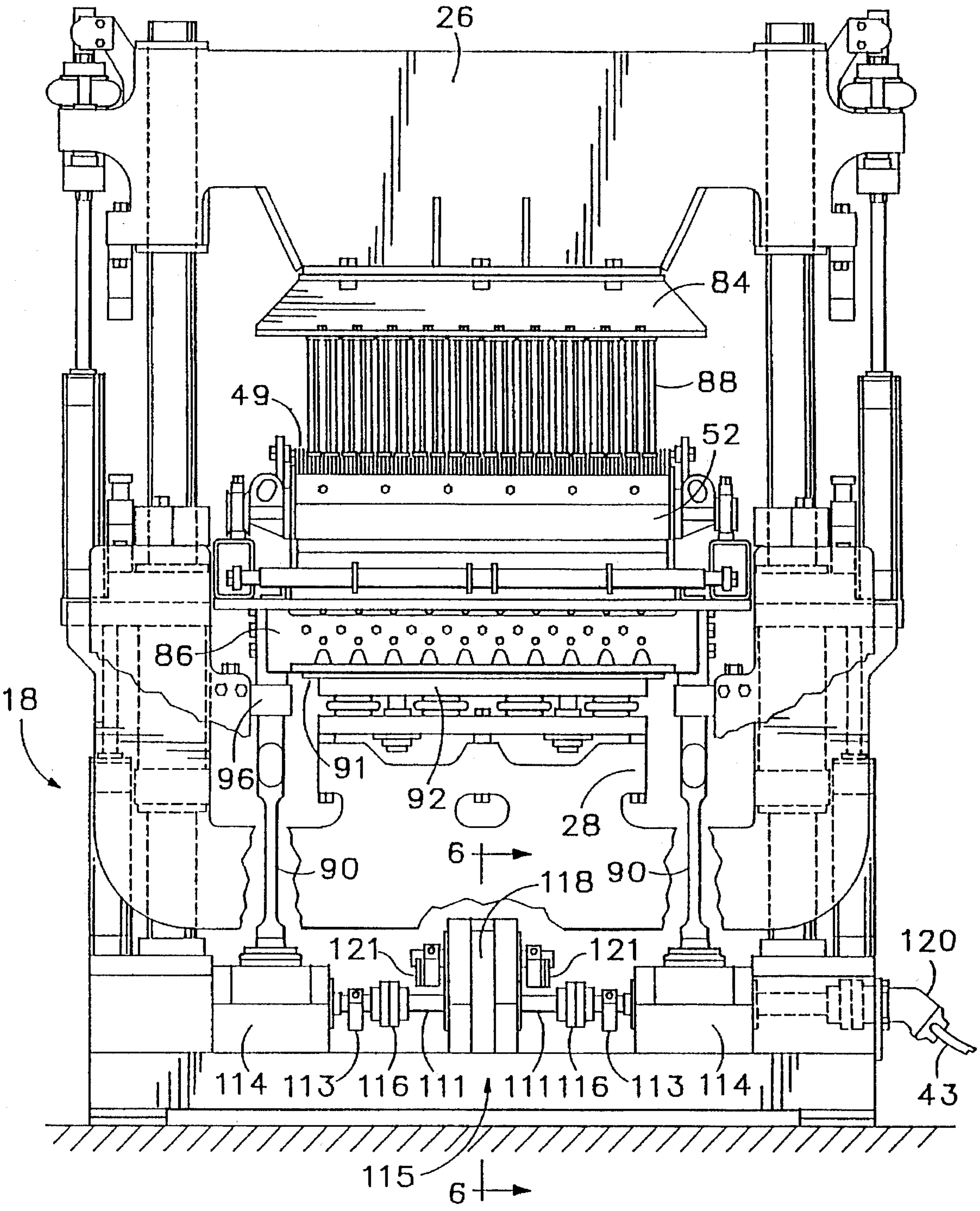
FIG. 4 is a partially broken away front elevation view of the product forming machine in FIG. 3 showing in detail a vibration system and the feed drawer assembly in a dispensing position.

FIG. 4 is a front elevation view, partially broken away, showing in detail the vibration system 115. The compression beam 26 and stripper beam 28 are shown in fully raised positions. In the raised position, head assembly 84 is lifted sufficiently upward so that feed drawer 52 can be moved under shoes 88. Wire brushes 49 are attached to the top of feed drawer 52 and rub the bottom of shoes 88 when moved into the forward position as shown in FIG. 4. In the raised stripper beam position, the table 92 lifts the pallet 91 from the pallet feeder 39 (FIG. 3) and presses the pallet against the bottom side of mold assembly 86.

The vibration system 115 includes a single drive shaft 111 that is connected in various sections. The drive shaft 111 is driven by drive motor 120. The drive shaft 111 actuates two vibrator units 114 each containing a bearing (see FIG. 5) eccentrically attached to drive shaft 111. An associated vibrator rod 90 is joined to the top of a bearing housing. A coupler 116 attaches each vibrator unit 114 to the gear box 118.

The gear box 118 rotates shaft 122 in a counter-rotating direction in relation to drive shaft 111. Each end of the counter-rotating shaft 122 is shown mounted with a detachable counter-weight 121. Each counter-weight 121 is offset 180 degrees with the eccentrically attached cam inside vibrator unit 114. A second set of counter-weights 113 are bolted to drive shaft 111 close to the inner side of each vibrator unit 114. The vibrator system 115 is shown in detail below in FIGS. 5 and 6.

Figure 5:
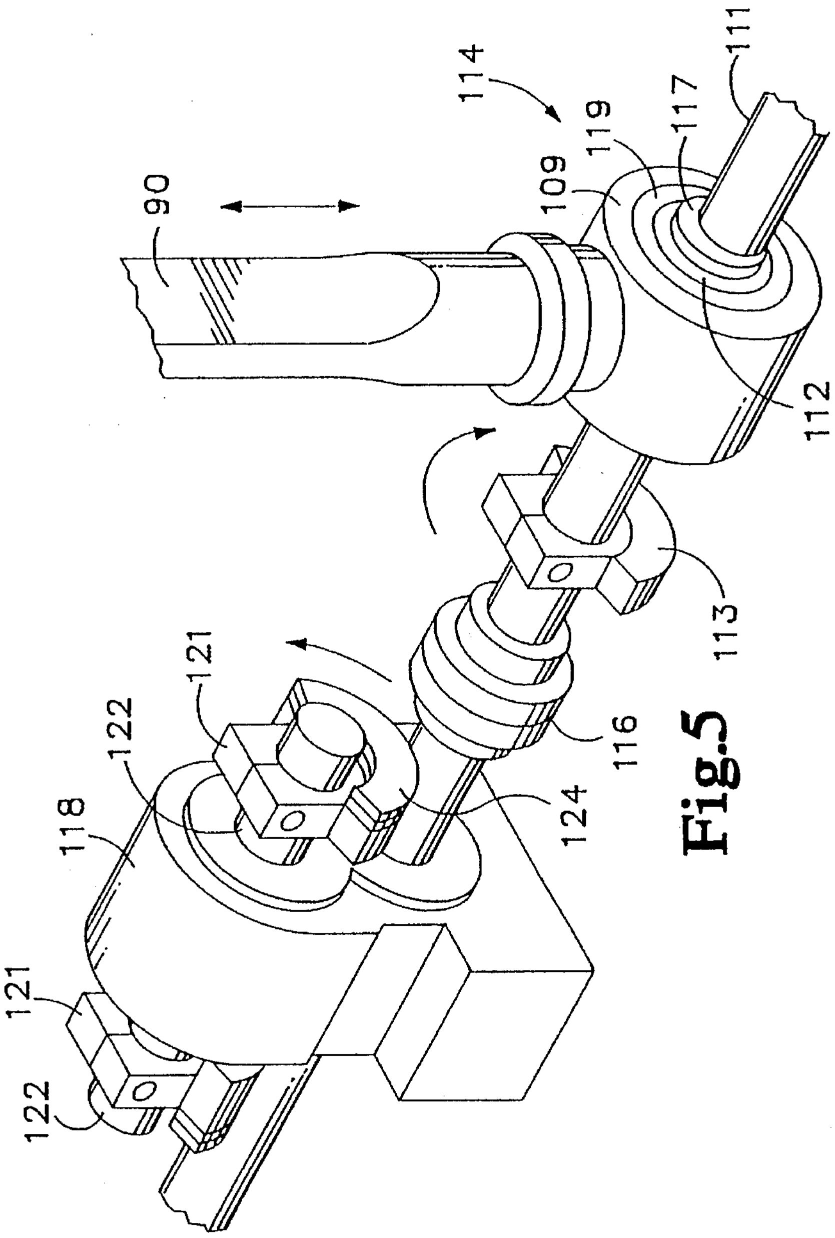
FIG. 5 is a perspective view of the vibration system shown in FIG. 4.

FIG. 5 is an isolated perspective view of the drive means for the vibrator system 115. The vibrator unit 114 is shown with the external casing removed to further illustrate how an eccentrically attached bearing 112 is attached to drive shaft 111. The drive shaft 111 includes a circular flange 117 co-axially joined in the middle of bearing 112. The drive shaft 111 is eccentrically aligned in flange 117. An outside bearing sleeve 119 is rigidly joined via an outside housing 109 to the bottom of vibrator rod 90. The bearing 112 freely rotates inside sleeve 119 about a horizontally aligned axis.

As drive shaft 111 rotates, for example, in a clockwise direction, flange 117 rotates eccentrically around drive shaft 111 in turn eccentrically rotating bearing 112 about drive shaft 111. Bearing 112 eccentrically rotates in sleeve 109 moving vibrating rod 90 up and down. In one embodiment, the center of gravity in counter-weight 113 and the center of gravity in flange 117 are set in the same angular direction in relation to drive shaft 111. The center of gravity in counter-weight 121, however, is off-set 180 degrees with that of counter-weight 113 and flange 117.

Counter-weight 121 rotates in a counter-clockwise direction and counter-weight 113 rotates in a clock-wise rotation. Thus, as drive shaft 111 rotates counter-weights 113 and 121 co-act to offset horizontal vibration created while traveling around their respective drive shafts. For example, when the center of gravity of counter-weight 113 and flange 117 are at the 1:00 o'clock position, the center of gravity of counter-weight 121 is at the 11:00 o'clock position. Accordingly, as counter-weight 113 and flange 117 rotate into an 8:00 o'clock position, counter-weight 121 is in the 4:00 o'clock position. Thus, the counter-weights co-act to off-set their horizontally exerted forces.

Due to the 180 degree off-set between count-weight 121 and counter-weight 113 the center of gravity of each counter-weight and flange 117 moves vertically upward and vertically downward at the same time. Thus, the vertical force of counter-weights 113 and 121 and flange 117 are additive when creating vertical vibration. Additional plates 124 can be attached to the sides of counter-weight 121 to fine tune vibration effects in the product forming machine. Alternative counter-weight configurations are also possible, for example, counter-weights 113 can be attached on each side of casing 109 to further negate horizontal vibration.

Figure 6:
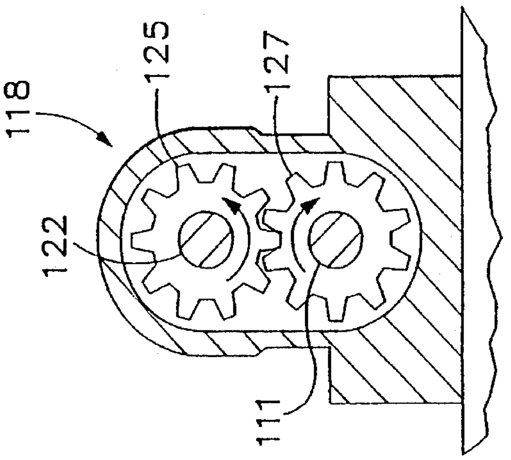
FIG. 6 is a side-section view of the vibration system gear box taken along lines 6—6 in FIG. 4.

FIG. 6 is a side-section view of the gear box 118 taken along lines 6—6 in FIG. 4. A gear 127 is co-axially joined to drive shaft 111 and an upper counter-rotating gear 125 is co-axially joined to shaft 122. As drive shaft 111 rotates in a clockwise direction, gear 127 drives gear 125 in turn driving shaft 122 in a counter-clockwise direction. It can be seen that both shaft 122 and drive shaft 111 are vertically aligned to eliminate the horizontal vibration effects of the counter-weights.

Figure 7:
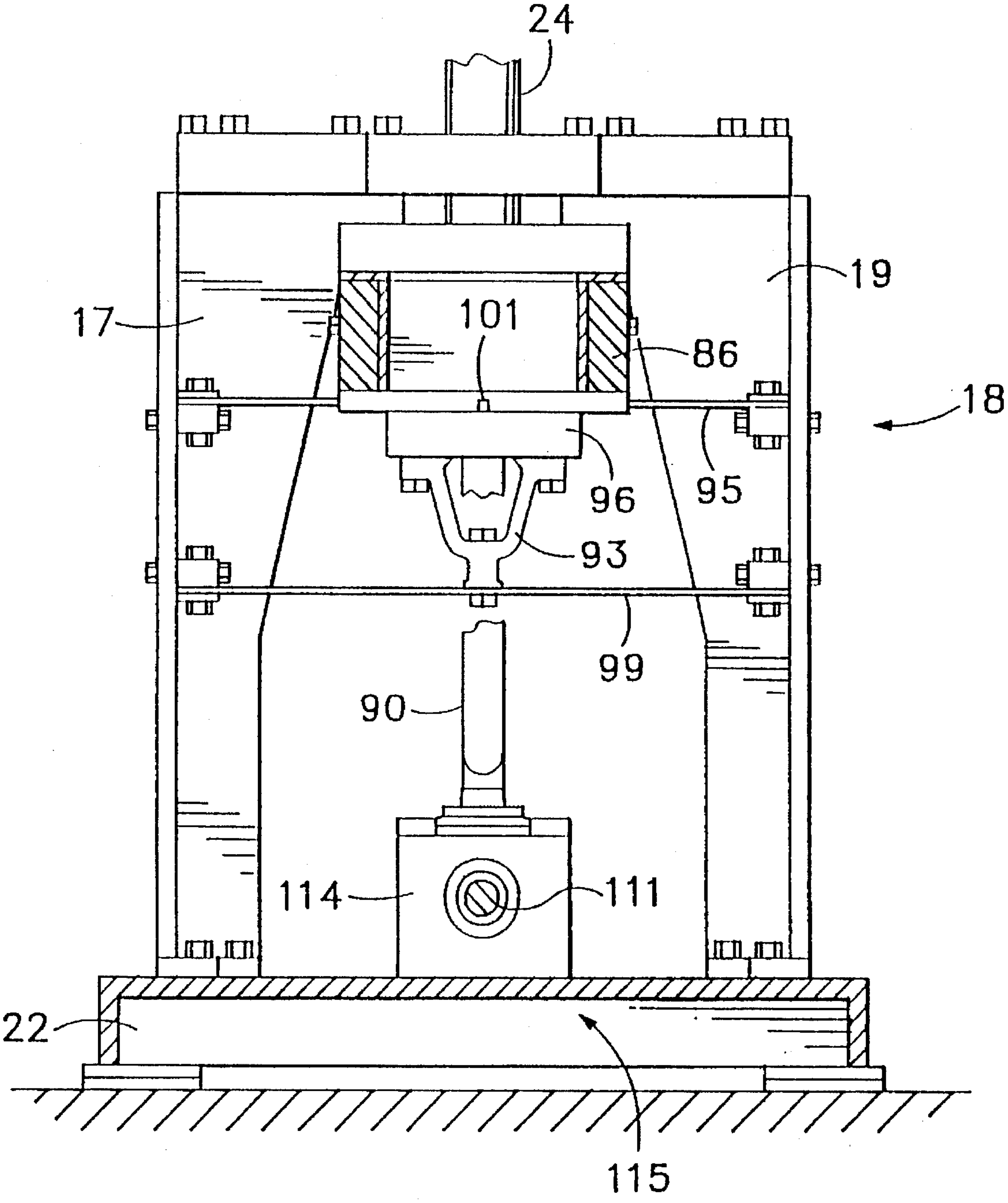
FIG. 7 is an isolated side-section view showing part of the vibration system shown in FIG. 4.

FIG. 7 is an isolated side-section view of the vibrator rod 90 and vibrator bracket 93 of vibration system 115. Upper spring steel plate 95 and lower spring steel plate 99 are each bolted on opposite ends to front and back frame supports 17 and 19, respectively. The spring steel plates 95 and 99 are joined in the center by vibration bracket 93. Shelf 96 extends laterally from the side of bracket 93 and supports mold assembly 86. A dowel 101 extending from the top of shelf 96 and mates with a corresponding hole in the bottom side of mold assembly 86. The vibrator rod 90 is joined at the top to the bottom of shelf 96 and is joined at the bottom to the top of vibrator unit 114.

As drive shaft 111 begins to rotate, vibrator unit 114 is activated moving vibrator rod 90 up and down as previously discussed. The vibrator rod 90 correspondingly vibrates shelf 96 and mold assembly 86. The spring steel plates 95 and 99 have a fairly small vertical thickness, however, have a relatively large horizontal width. Thus, steel plates 95 and 99 allow the mold assembly 86 to be moved fairly easily up and down in a vertical direction, however, provide rigid resistance to horizontal displacement of mold assembly 86.

It is important to note that the bottom side of each mold assembly 86 is placed into the product forming machine is mounted at the same location on the top of shelf 96. Dowel 101 allows each mold assembly, such as mold assembly 86, to be prealigned and bolted in the same position on shelf 96. Because each mold assembly 86 is mounted at a bottom side at the same vertical position on shelf 96, no special adjustments have to be made to any of the lower apparatus, such as stripper beam 28, when molds are exchanged.

Figure 9:
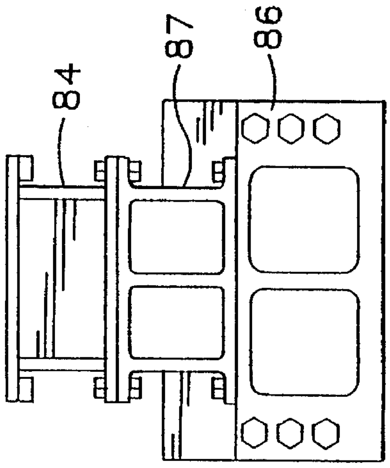
FIG. 9 is a side view of the mold box and alignment brackets shown in FIG. 8.
Figure 8:
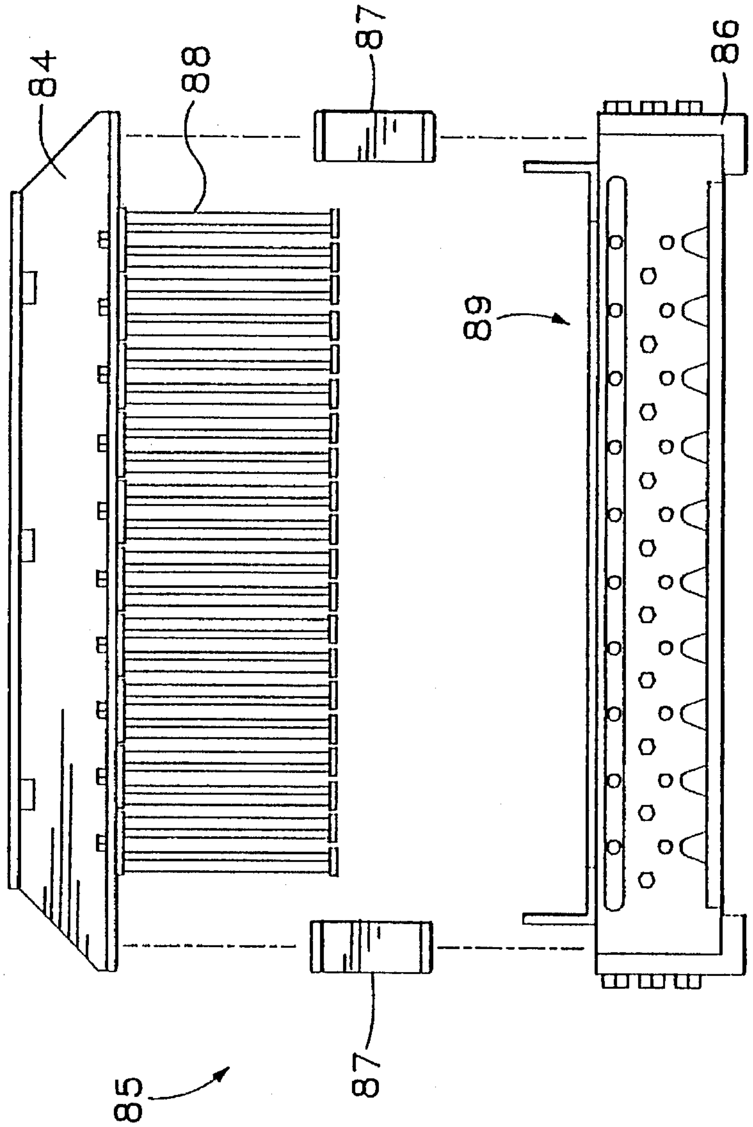
FIG. 8 is a front view of a mold box and alignment brackets.

FIG. 8 is a detailed front view and FIG. 9 is a detailed side view of a mold box 85 including the head assembly 84 and the mold assembly 86. The head assembly 84 is initially aligned with mold assembly 86 using an alignment machine known to those skilled in the art or simply by hand. During the alignment process the shoes 88 of head assembly 84 are inserted into cavities 89 inside mold assembly 86. After the shoes 88 are inserted and the head assembly aligned at a correct position with relation to mold assembly 86, alignment brackets 87 are bolted to both the head assembly 84 and the mold assembly 86.

Alignment brackets 87 lock the mold box 85 in the aligned condition prior to being mounted in the product forming machine 12. The locked mold box 85 is mounted to the product forming machine 12 by first inserting the holes in the bottom of mold assembly 86 into the dowels 101 extending upward from shelf 96 (FIG. 7). Mold assembly 86 is then bolted to shelf 96. Compression beam 26 is then lowered down against the top of head assembly 84. The head assembly 84 and compression beam 26 are then bolted together and the alignment brackets 87 removed. After removing alignment brackets 87, the head assembly 84 and the mold assembly 86 maintain their pre-aligned positions. Thus, the mold box does not have to be jimmied about the compression beam 26 and shelf 96 until the assemblies are correctly aligned. Down time for the product forming machine is reduced since the time required to exchange and align mold boxes is reduced.

Figure 10:
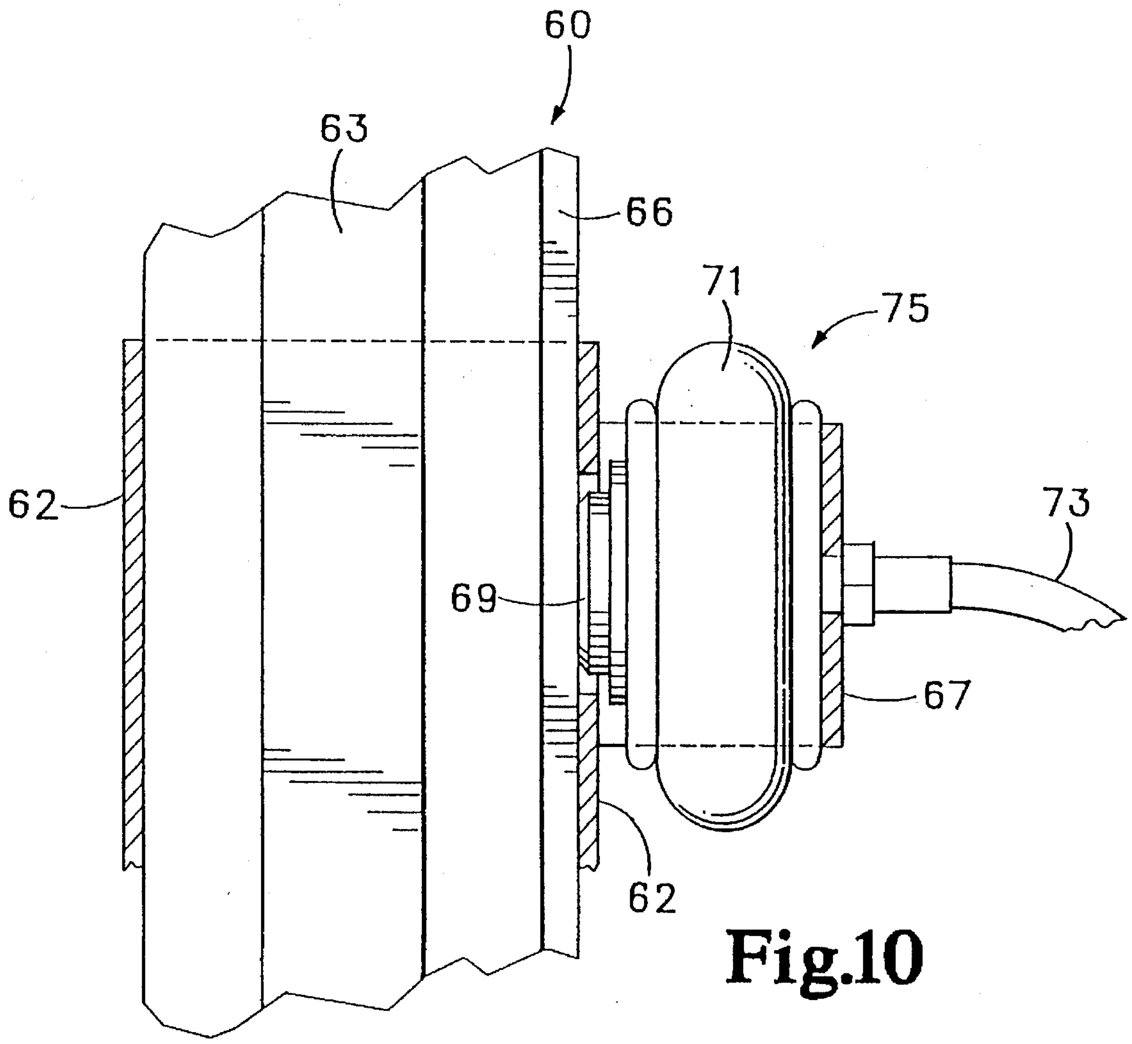
FIG. 10 is a partially broken away side view of an airlock used for holding the feed drawer assembly in a given vertical position.

FIG. 10 is a detailed partially broken away view of the air-locks 75 shown in FIG. 1. Each telescoping leg 60 is locked into place by an upper and lower air-lock 75. Each air-lock 75 includes an air-bag 71 contained within a housing 67. A puck 69 is joined to a front end of the air bag 71 and extends transversely through exterior leg member 62. The puck 69 rests against a skid plate 66 on the outside of interior leg member 63.

Referring to both FIGS. 1 and 10, jack screws 68 are used to hold feed drawer assembly 14 a proper distance above the top of mold assembly 86. The dispensing of concrete material into mold assembly 86 is described in detail below in FIGS. 13–18. Because molds have various heights, the feed drawer assembly 14 must be able to move up and down. Jack screws 68 are extended by rotating sprockets 70 in turn moving platform 64 upward by rotating sprockets 70. When motor 74 is activated, chain 72 rotates each jack screw sprocket 70 at the same time and at the same speed. According to the direction of sprocket rotation, the jack screws extend or retract a threaded rod.

As the threaded rod moves upward, the interior leg member 63 slides upward from the top of exterior leg member 62. As the interior leg member 63 extends, platform 64 is lifted upwards in turn lifting feed drawer assembly 14. After the feed drawer assembly is moved into the correct position above mold assembly 86, air locks 75 are activated locking each telescoping leg 60 in its present extended position.

The air locks 75 lock the telescoping legs 60 by inflating air-bag 71. Air bag 71 is inflated by sending air through air hose 73. As air-bag 71 inflates, puck 69 clamps firmly against skid plate 66, locking the interior leg member 63 and exterior leg member 62 together. Air-lock 75 serves to maintain a constant vertical position for feed-drawer assembly 14 above mold box 85 while at the same time taking weight off the jack screws 68. To change the vertical position of feed-drawer assembly 14, air is exhausted from air-bag 71 relieving the pressure of puck 69 against skid plate 66. Interior leg member 63 is then free to move up or down with the extension or retraction of jack screws 68.

Figure 12:
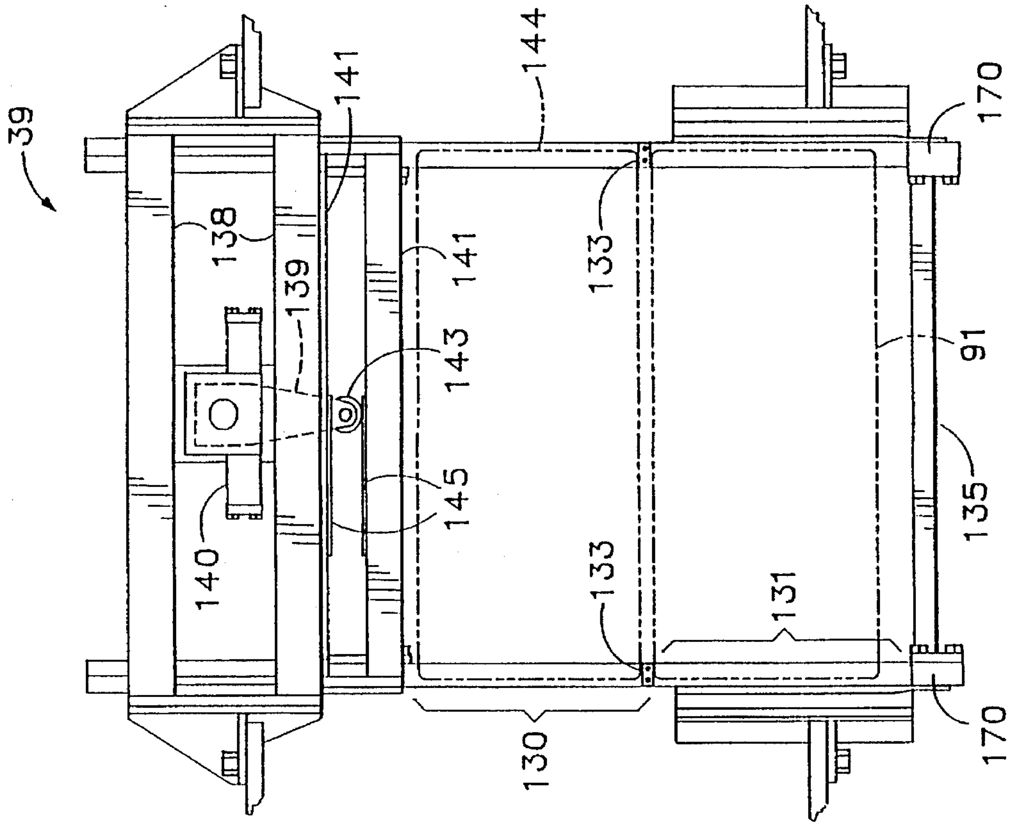
FIG. 12 is an isolated top-view of the pallet feeder shown in FIG. 11 with the pallet feeder in a "receiving" position.
Figure 11:
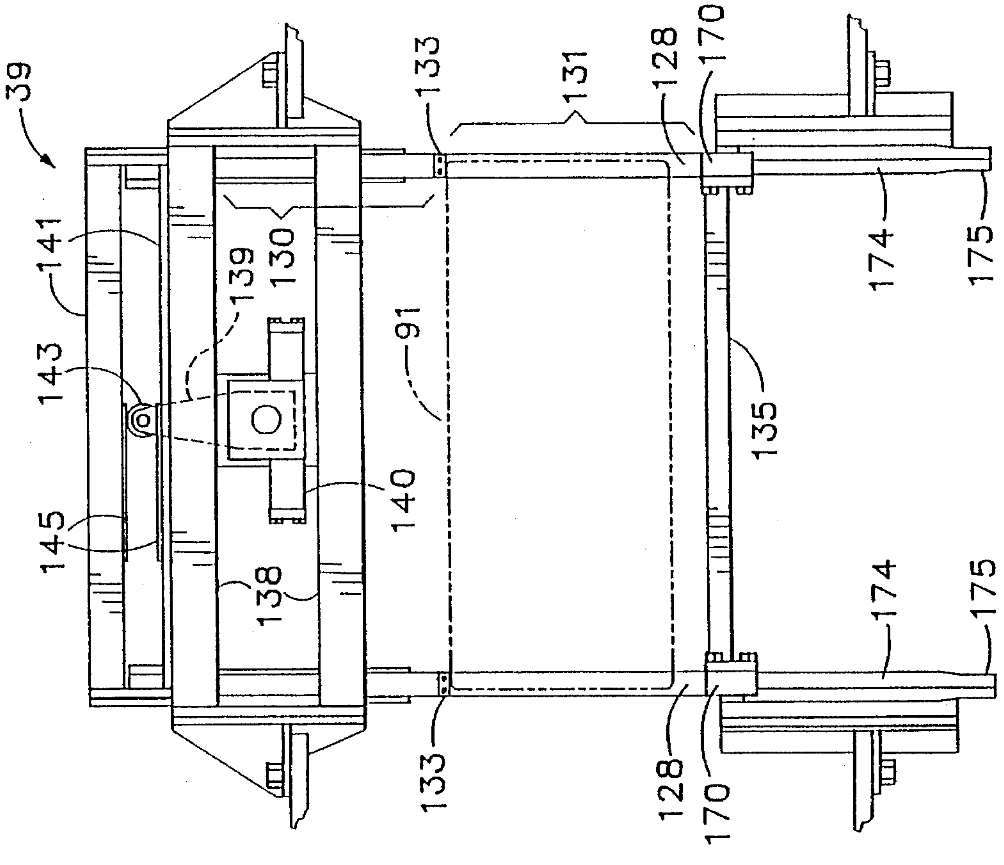
FIG. 11 is an isolated top-view of a pallet feeder previously shown in FIG. 1 positioned in a "on-deck" position.

FIGS. 11 and 12 are isolated top views of the pallet feeder 39 shown in FIG. 1. The pallet feeder 39 includes parallel bars 128 positioned into a back infeed rack 130 and a front outfeed rack 131 by stops 133. Bars 128 are joined at the front by a beam 135 and joined at the back by drive beams 141. Motor 140 is attached underneath support beams 138 and rotates arm 139. Arm 139 extends over drive beams 141. Wheel 143 is slidingly joined between slide bars 145 on the inside of drive beams 141. Wheels 170 at the front end of pallet feeder 39 roll back and forth along rail 174. The front end of rail 174 includes a downwardly sloping ramp 175.

FIG. 11 shows pallet feeder 39 in an "on-deck" position with arm 139 rearwardly directed. Pallet 91 is shown in dashed lines placed in the outfeed rack 131. In the "on-deck" position, outfeed rack 131 is positioned underneath mold assembly 86 (see FIG. 13). As motor 140 is energized, arm 139 is rotated in a counter-clockwise direction. As arm 139 begins to rotate, drive beams 141 are pulled forward as wheel 143 begins to slide to the left between slide bars 145.

FIG. 12 shows pallet feeder 39 in a "receiving" position after arm 139 has rotated 180 degrees from the position shown in FIG. 11. A pallet 144 is shown in dashed lines placed on the infeed rack 130. In the receiving position, infeed rack 130 is moved underneath mold assembly 86 and outfeed rack 131 is moved forward out from underneath mold assembly 86. As the pallet feeder 39 moves forward into the receiving position, wheels 170 roll along rail 174 onto ramp 175. After pallet 91 is carried away and pallet 144 is lifted from infeed rack 130, arm 139 is counter-rotated 180 degrees back into the position shown in FIG. 11.

The natural oscillating motion of arm 139 allow pallets to be quickly moved from conveyer 16 (FIG. 2) to a position underneath the mold assembly 86. For example, as the arm 139 moves into the "on-deck" position in FIG. 11, the pallet feeder 39 naturally slows down as the wheel 143 starts to move in a direction substantially parallel with drive beams 141. The pallet feeder 39 slows for a sufficient amount of time so that conveyer 16 can drop a pallet onto infeed rack 130.

Correspondingly, the pallet feeder slows as it approaches the "receiving" position shown in FIG. 12. Thus, the stripper beam has sufficient time to lift pallet 144 from infeed rack 130 and a second conveyer has time to remove pallet 91 from the outfeed rack. However, the pallet feeder 39 moves substantially faster while in an intermediate position halfway between the "on-deck" and "receiving" positions. During this state, the wheel 143 is moving in a forward direction, perpendicular with drive beams 141. Thus, arm 139 reduces cycle time by moving pallet feeder 139 as quickly as possible during the middle of the pallet transport cycle. The natural "slow down", "speed up", "slow down" motion of pallet feeder 39 also eliminates the need for additional speed control circuitry and position sensors.

PRODUCT FORMING CYCLE

Figure 13:
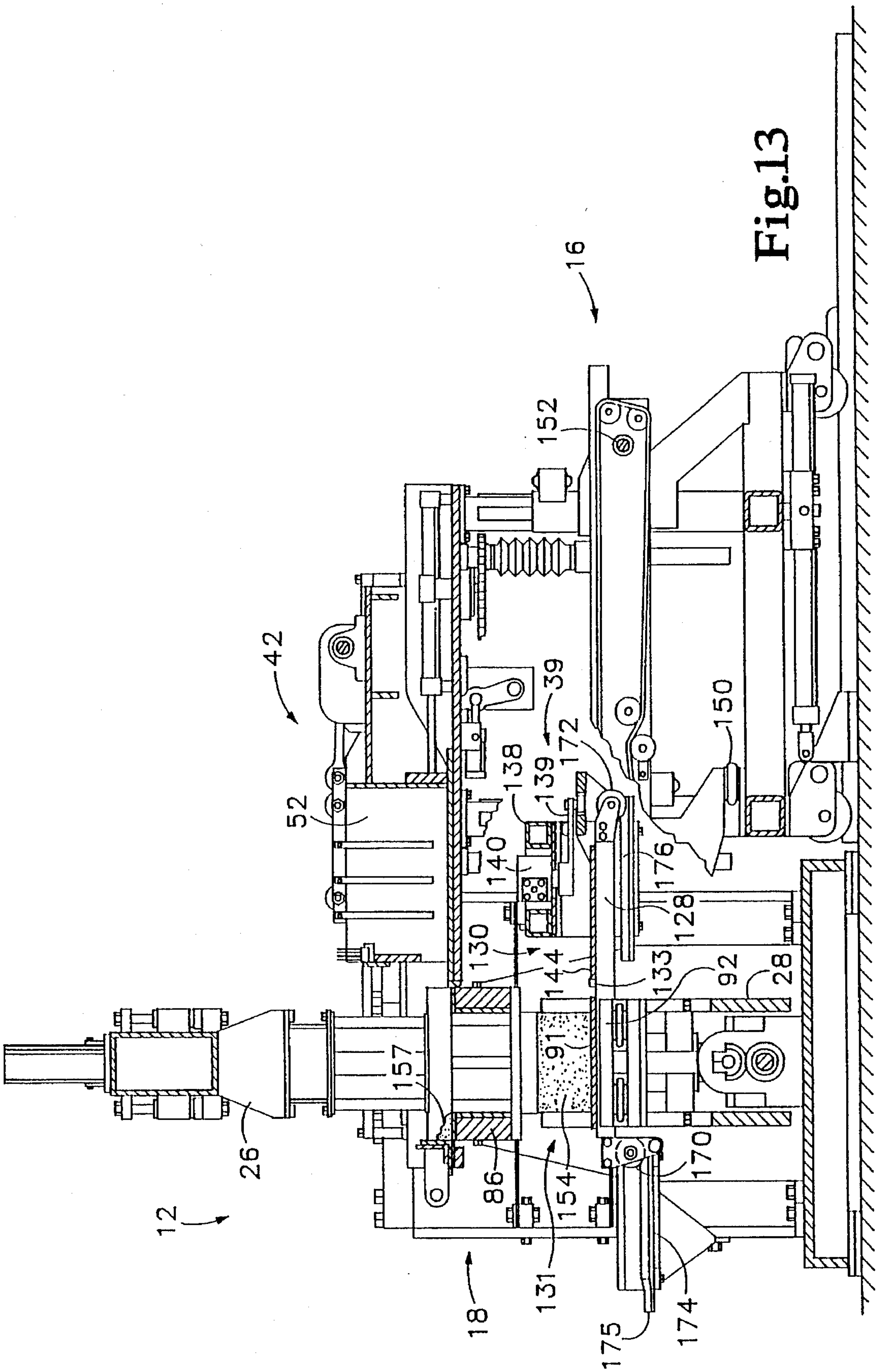
FIG. 13 is a side-section view of the product forming machine shown in FIG. 1 with the conveyer shown partially broken away and the pallet feeder shown in the "on-deck" position.

Referring to FIGS. 13–18, the various stages of the product forming process are described. FIG. 13 shows the product forming section 12 in an initial stage with air-bag 150 of conveyer 16 is in a deflated condition. Upon deflating air-bag 150, the conveyer 16 rotates about pivot 152 lowering the front end of the conveyer 16. As the front end of the conveyer 16 moves downward, the pallet 144 previously shown positioned against the front stops 142 (FIG. 2) is dropped onto infeed rack 130 with a front end of pallet 144 resting against stop 133.

Pallet feeder 39 is now referred to as being in the "on-deck" position ready to move infeed rack 130 underneath mold assembly 86. During a first product forming cycle no concrete products have yet been formed and pallet 91 is empty. However, to illustrate a typical product forming cycle after the product forming section 12 has completed at least one full cycle, the outfeed rack 131 is shown carrying a loaded pallet 91 containing product 154. Initially, stripper beam 28 is in a lowered position so that table 92 sits slightly below outfeed rack 131. The compression beam 26 is shown in a partially raised position above mold assembly 86. A small amount of concrete material 157 remains on the front edge of mold assembly 86 from the previous product forming cycle.

Figure 14:
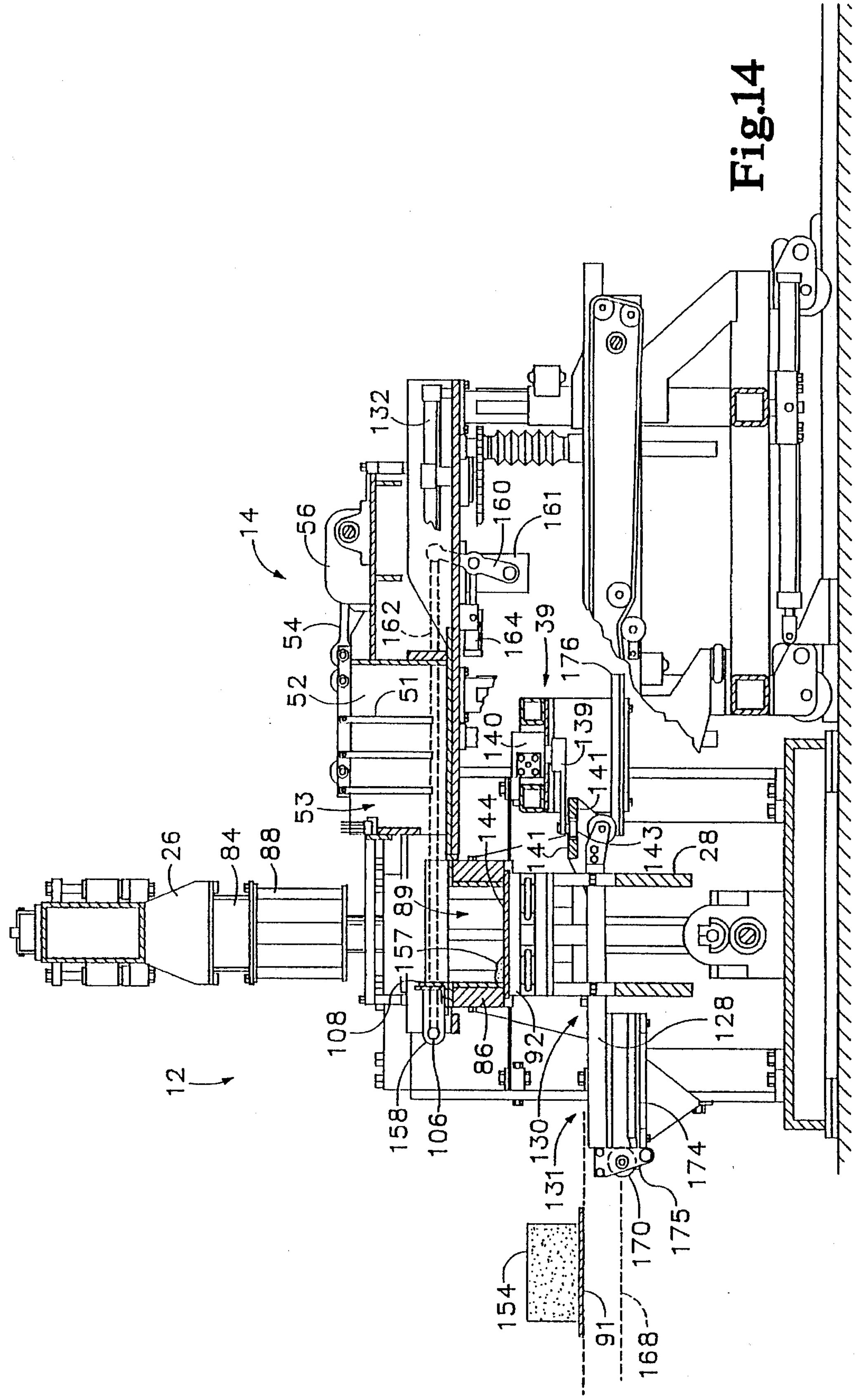
FIG. 14 is the side-section view of FIG. 13 showing in detail the wiper blade assembly.

FIG. 14 shows the wiper blade pull back stage of the product forming process. The feed drawer assembly 14 is partially broken away to better illustrate the operation of wiper blade 108.

The compression beam 26 is in a raised position where the shoes 88 of head assembly 84 are raised above the top of feed drawer 52. Arm 139 of the pallet feeder 39 is rotated 180 degrees by motor 140 into the forward receiving position. As arm 139 rotates forward, wheel 143 slides between drive beams 141 in turn moving infeed rack 130 underneath mold assembly 86. Correspondingly, outfeed rack 131 is moved forward from underneath mold assembly 86. The front wheels 170 of pallet feeder 39 travel down ramp 175 lowering the front end of outfeed rack 131 just slightly below a transport conveyer 168 shown in phantom. The transport conveyer 168 lifts pallet 91 and concrete product 154 from outfeed rack 131. Conveyers such as transport conveyer 168 are known to those skilled in the art and, therefore, is not described in detail.

As infeed rack 130 moves into the receiving position underneath mold assembly 86, stripper beam 28 is raised upward causing table 92 to lift pallet 144 up from infeed rack 130. Stripper beam 28 is raised until pallet 144 presses against the bottom side of mold assembly 86. Pallet 144 thereby seals the bottom opening of cavities 89. Again, it is important to note that each mold is mounted onto shelf 96 (FIG. 7) at the same vertical position. Thus, stripper beam 28 rises the same distance to place a pallet against the bottom of a mold regardless of the which mold is presently being used. Therefore, no special calibrations have to be made to the stripper beam 28 when a mold is mounted to frame 8.

The wiper blade 108 is attached by flange 158 to rod 106. The rod 106 is joined at opposite ends to a front end of rods 162 that extends through each top beam 59 (FIG. 3). A back end of rod 162 is joined to the top of lever 160. Lever 160 is joined in the center to hydraulic piston 164 and is pivotally joined at a bottom end to flange 161.

Piston 164 is extended rotating lever 160 back. Rod 162 in turn pulls back on rod 106 moving wiper blade 108 backwards. As wiper blade 108 is pulled back, the excess concrete material 157 (FIG. 13) is pushed back into mold assembly 86. Piston 164 is then retracted pushing wiper blade 108 back into its original forward position shown in FIG. 15. Wiper blade 108 prevents concrete material from accumulating or falling off the front edge of mold assembly 86.

Figure 15:
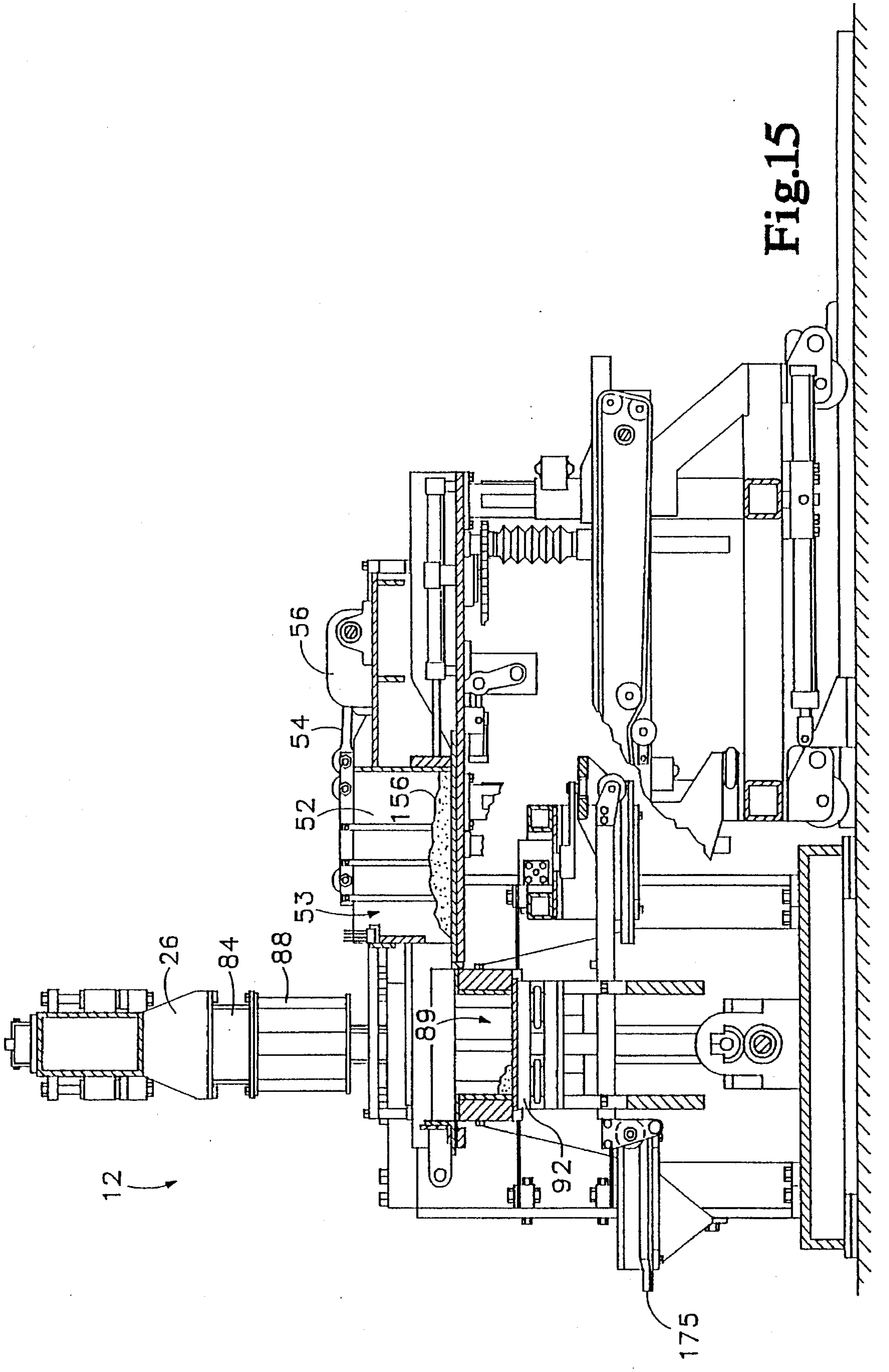
FIG. 15 is the side-section view of FIG. 13 showing the pallet feeder in the "on deck" position.

FIG. 15 shows the product forming section 12 in a feed stage where a viscous concrete material 156 has been deposited through the top of feed drawer 52 into internal cavity 53. A cement feeder (not shown) deposits the concrete material into feed drawer 52. Means for depositing the concrete material 156 into feed drawer 52 are known to those skilled in the art and is, therefore, not described in detail.

Figure 16:
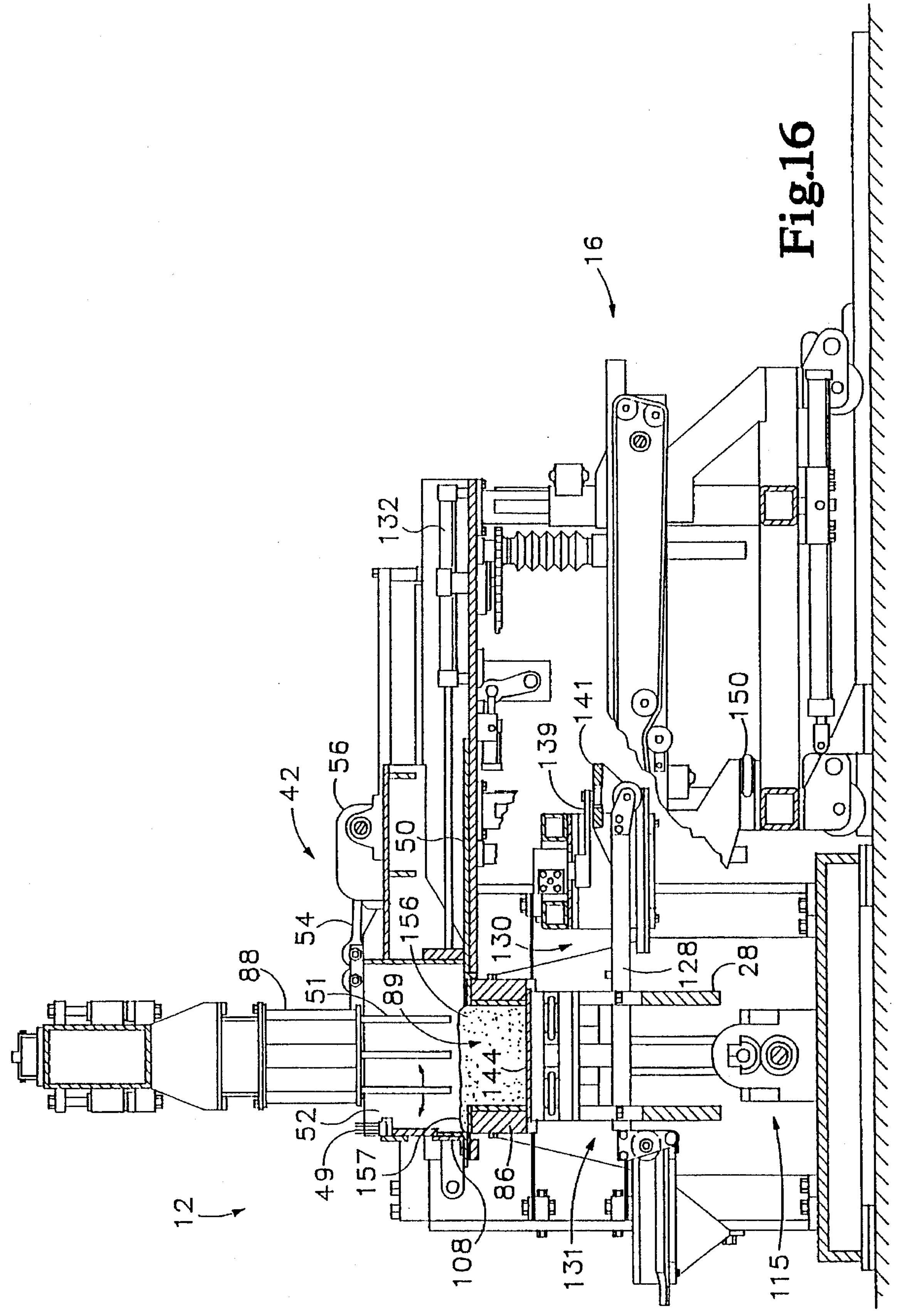
FIG. 16 is the side-section view of FIG. 13 showing the feed drawer assembly dispensing concrete material into a mold assembly.

FIG. 16 shows the cement dispensing stage of the product forming process. After stripper beam 28 lifts pallet 144 from infeed rack 130 and against the bottom side of mold assembly 86, piston 132 extends forward moving feed drawer 52 over the top of mold assembly 86. As feed drawer 52 is moved forward, the concrete material 156 is pushed from plate 50 into mold assembly 86. As feed drawer 52 moves forward, brushes 49 clean concrete material from the bottom of shoes 88 that may remain from the last product forming cycle. A slight amount of concrete material 157 may accumulate on a front lip of mold assembly 86. Concrete material is prevented from being pushed over the front end of mold assembly 86 by wiper blade 108.

As the concrete material 156 is moved into mold assembly 86, vibration system 115 is activated shaking mold assembly 86. At the same time that the concrete material 156 is deposited into mold 89, motor 56 eccentrically rotates a back end of rotator arm 54 causing the agitator rods 51 to oscillate back and forth. Vibrating mold assembly 86 allows the concrete material 156 to spread evenly inside the mold cavities 89. Different vibration techniques are used to ensure a homogeneously formed product and are described in detail below.

After stripper beam 28 has lifted pallet 144 from infeed rack 130, arm 139 is rotated in a reverse 180 degree direction moving the pallet feeder 39 backwards. Before infeed rack 130 returns back to its original "on-deck" position, air-bag 150 is re-inflated. The front end of conveyer 16 is in turn raised back above infeed rack 130 as previously shown in FIG. 2. Another pallet is then moved against the front stops 142 (FIG. 2) of the conveyer 16.

Figure 17:
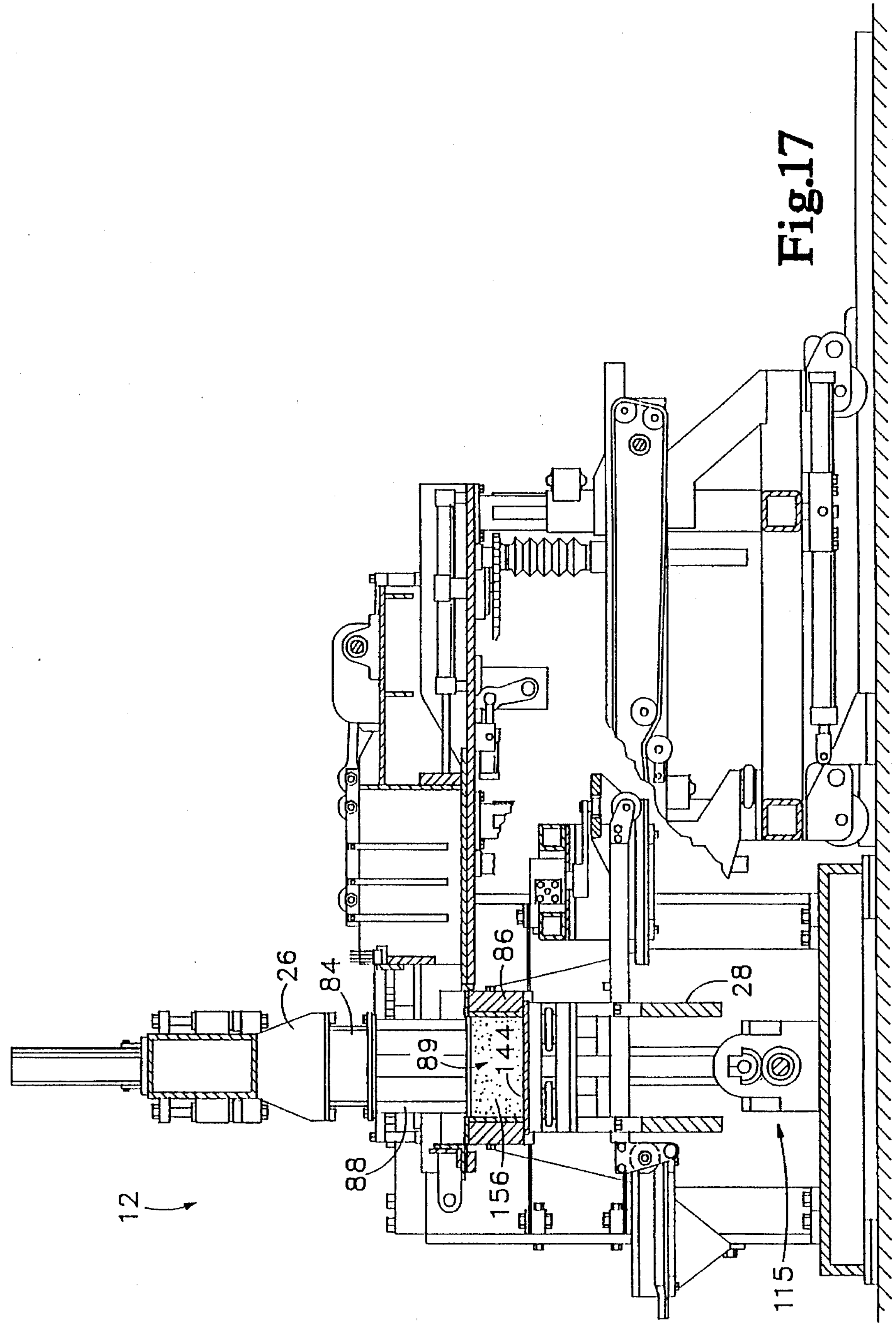
FIG. 17 is the side-section view of FIG. 13 showing with the product forming section in a compression stage.

FIG. 17 shows the compression stage of the product forming section 12. While pallet 144 remains pressed firmly against the bottom side of mold assembly 86, compression beam 26 is moved downward. The shoes 88 of head assembly 84 insert into the cavities 89 in mold assembly 86 compressing the concrete material 156. vibration system 115 continues to shake mold assembly 86 as shoes 88 compress the concrete material 156. Continuously vibrating mold assembly 86 with vibration system 115 during compression further distributes the concrete material evenly in the mold assembly 86.

Compression beam 26 is lowered until upper height stop 102 contacts lower height stop 104 (FIG. 3). Upon making contact, the height stops 102 and 104 complete an electrical connection that initiate the next product forming stage that removes the compressed concrete material 156 from mold assembly 86 (stripping stage).

Stripping Stage

Figure 18:
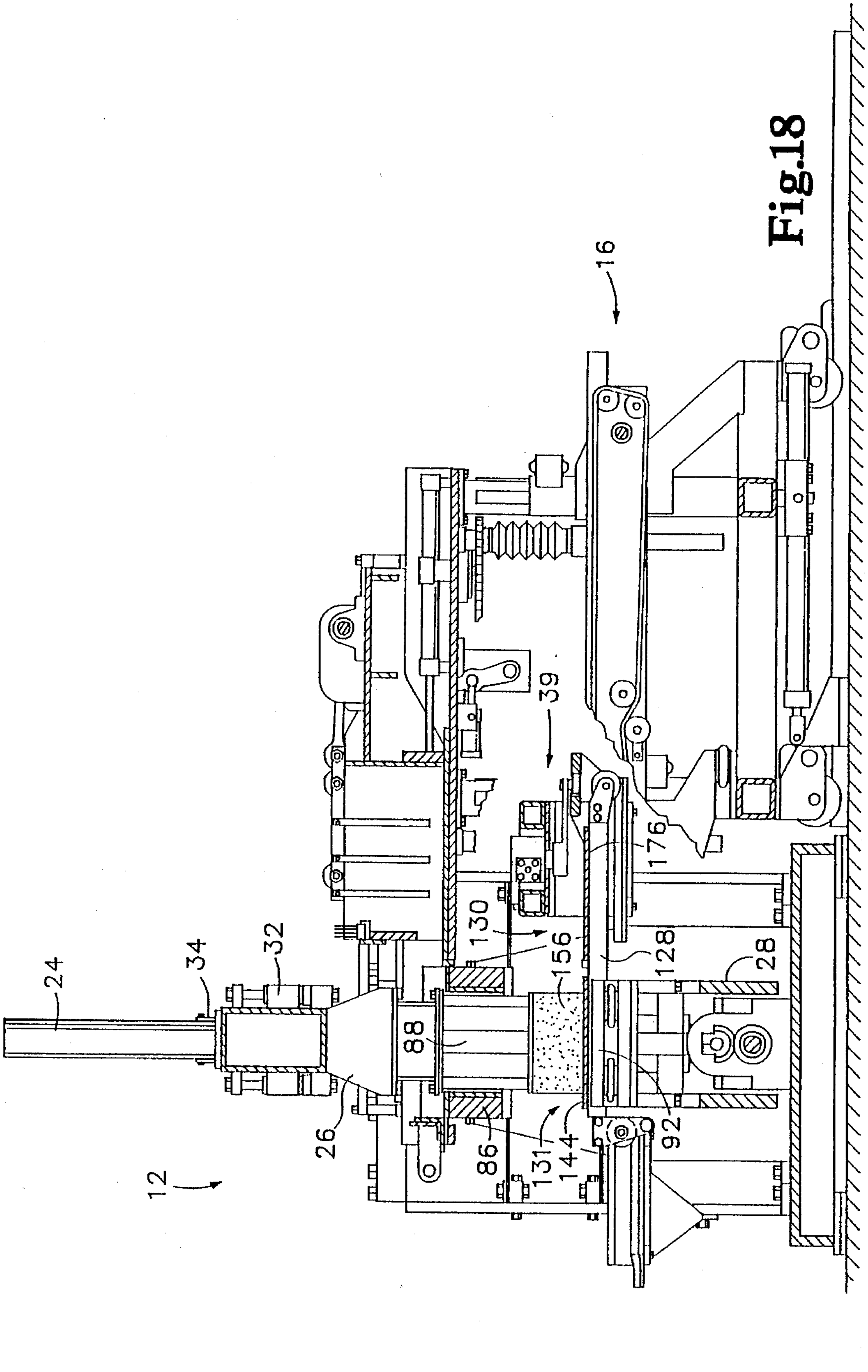
FIG. 18 is the side-section view of FIG. 13 showing the product forming section in a stripping stage.

FIG. 18 shows the product forming section 12 during a stripping stage after the compressed concrete material 156 is removed from mold assembly 86. After the compression beam 26 has been lowered downward a predetermined distance (i.e., when the height stops 102 and 104 make contact), disk brakes 34 are activated locking onto tabs 36 (FIG. 1). Stripper beam piston 40 (FIG. 1) is then retracted lowering stripper beam 28. Since compression pistons 28 are mounted to the top shelf of stripper beam 28, as stripper beam 28 is lowered, the shoes 88 lower at the same speed as table 92. Thus, shoes 88 help push the concrete from mold assembly 86 without fear of over compression.

Compression beam 26 is interlocked with stripper beam 28 until the shoes 88 drop a predetermined distance. For example, until the bottom of shoes 88 reach the bottom of mold assembly 86. Compression beam 26 is then moved upward at the same speed that stripper beam 28 continues to move downward. Thus, the shoes 88 remain at their same relative position in relation to mold assembly 86 (i.e., at the bottom of mold assembly 86). By keeping the bottom of shoes 88 at a constant position in relation to mold assembly 86, stray concrete material attached to the inside of mold assembly 86 is less likely to fall onto concrete product 156.

Because compression beam 26 is being raised at the same time stripper beam 28 is being lowered, less time is required to move compression beam 26 back into a fully raised position for the beginning of the next product forming cycle. Since, the time required to move the stripper beam back into the fully raised position is less, the product forming cycle time is reduced.

Table 92 is further lowered by stripper beam 28 underneath pallet feeder 39 dropping the loaded pallet 91 onto the top of outfeed rack 131. At the same time pallet 91 is being lowered, a new pallet 176 is being deposited by conveyer 16 onto infeed rack 130. Compression beam 26 is then moved into a fully raised position and pallet feeder 39 moved forward. The now molded concrete product 156 is moved out from underneath mold assembly 86 and pallet 176 moved into the "receiving" position for the next product forming cycle.

Hydraulic Control

Figure 19:
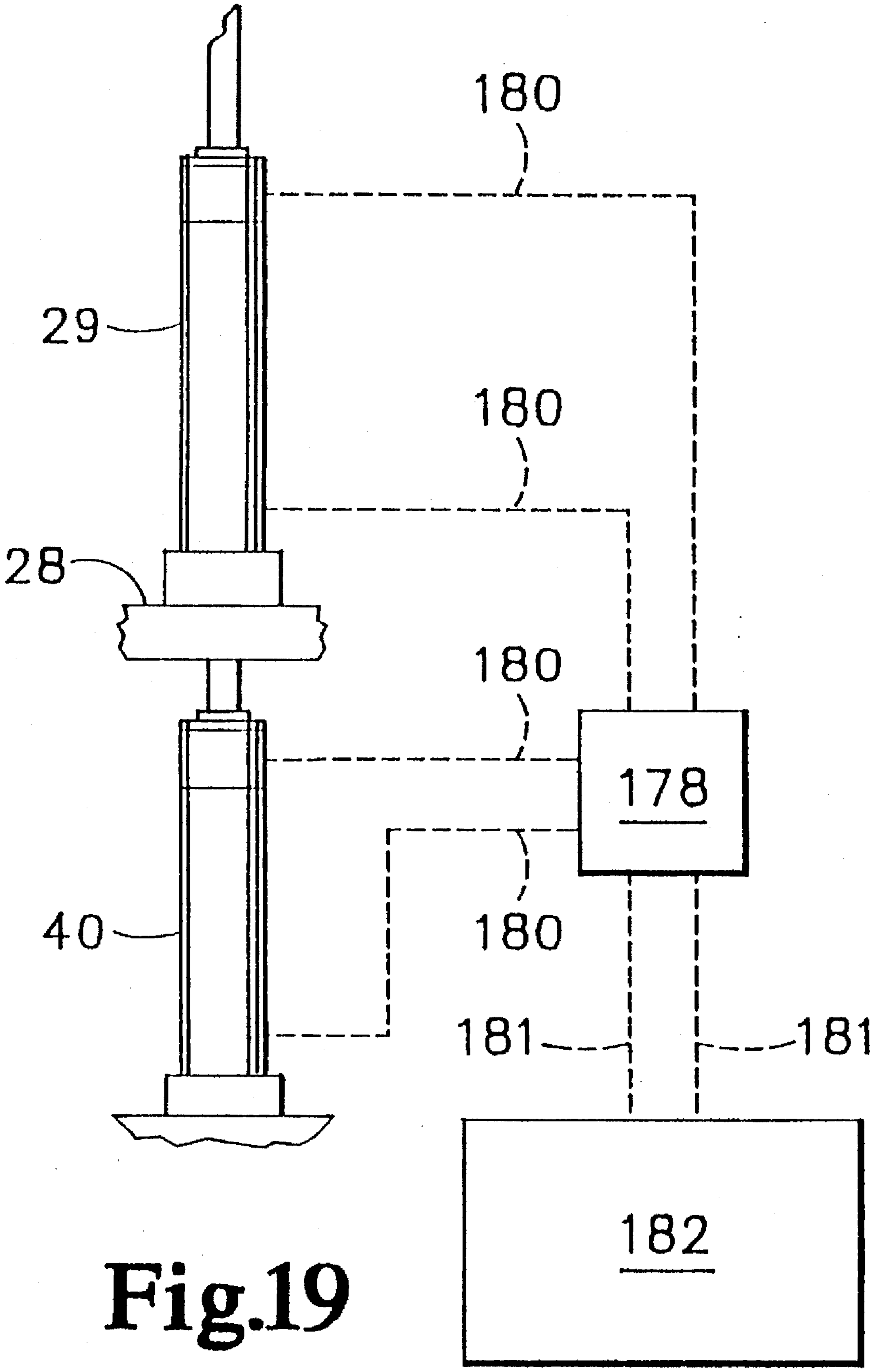
FIG. 19 is a schematic diagram showing the hydraulic control system for compression and stripper pistons in the product forming section.

FIG. 19 is a schematic diagram showing in further detail the operation of compression piston 29 and stripper piston 40. A manifold 178 directs hydraulic fluid to and from pistons 29 and 40 via lines 180. The manifold 178 is fluidly coupled to a hydraulic fluid conditioning tank 182 by lines 181. Manifold 178 controls the transfer of hydraulic fluid between pistons 29 and 40 and allows the compression beam 32 to rise at the same rate that stripper beam 28 falls as described above during the stripping process.

Once the shoes 88 of the head assembly 26 are lowered to a predetermined distance (i.e., the desired size of the cement product) and the product is stripped from the mold assembly 86, the shoes 88 are sent back up before stripper beam 28 has dropped the loaded pallet onto the pallet feeder 39. This allows the shoes 88 to be raised very slowly preventing loose cement material sticking to the side of the mold and on the shoes 88 from falling onto the formed cement product. In addition, by raising compression piston 29 while stripper beam 28 completes its downward path, less time is required later on to raise the compression beam 26 back into a fully raised position.

To ensure that the compression piston 29 is being extended at the same rate that stripper piston 40 is being retracted, manifold 178 simply transfers hydraulic fluid from stripper piston 40 to compression piston 29. By replacing volume with volume, no matter what speed the stripper beam 28 is lower, the compression beam 26 is raised at the same speed. Thus, shoes 88 remain at the same position in relation to the mold assembly 86. Also, less hydraulic fluid is used since the same hydraulic fluid is used for driving both pistons 29 and 40.

Every product forming cycle, manifold 178 recirculates some of the hydraulic fluid from pistons 29 and 40 back to tank 182. Tank 182 reconditions the hydraulic fluid for further use. Thus, every few product forming cycles the hydraulic fluid is completely replaced. This eliminates the possibility that hydraulic fluid is simply transferred back and forth between pistons 29 and 40. If hydraulic fluid were never transferred back to conditioning tank 182, the hydraulic fluid would get hot and cook seals in the pistons.

Vibration

As discussed above, the mold assembly 86 is vibrated to allow the viscous concrete material to distribute evenly when dispensed in the mold cavities. The vibration system 115 is designed to minimize horizontal vibration (i.e., lateral displacement) while at the same time providing effective vertical vibration to the mold assembly 86. By reducing horizontal vibration, less vibrational stress is placed on the various parts of the product forming machine. Less vibrational stress increases machine operating life and reduces the frequency of machine readjustments.

Eliminating horizontal vibration also allows the shoes 88 of head assembly 84 to be aligned closer to the inside cavities 89 of mold assembly 86. For example, if there is alot of horizontal vibration, shoes 88 may strike the inside walls of the mold cavities possibly damaging the mold box. Thus, the shoes 88 when inserted into the mold must be spaced a minimum distance from the inside cavity walls. Limiting the minimum distance that the shoes 88 can be aligned next to the inside walls of the mold cavity restrict the level of detail that can be created in the formed products. By reducing horizontal vibration, the shoes 88 can be placed closer to the inside walls of the mold cavities allowing higher precision product fabrication and reduces wear. In addition, the shoes 88 are more effective in both compacting and stripping the concrete material in the mold assembly 86.

The product forming machine dampens vertical vibration in the frame. It is important that even the vertical vibration is isolated as much as possible to the mold assembly 86. For example, if the frame 18 vibrates vertically 180 degrees out of phase with the mold assembly 86, frame vibration will dampen mold vibration. By reducing frame vibration, the head assembly shoes 88 are also more effective in compressing concrete. For example, if both the compression beam and stripper beam vibrate 180 degrees out of phase, the shoes 88 are less effective in exerting strong rapid forces upon the top surface of the concrete material.

Several features on the product forming section 12 help isolate vibration to the mold assembly 86. Referring to FIG. 3, air-bags 35 on attachment assembly 30 dampen vibration in compression beam 26. Air-bags 94 also reduce the amount of vibration transferred from mold assembly 86 to stripper beam 28 during the compression stage. The disk brakes 34, however, lock compression beam 26 to stripper beam 28 during the stripping stage. By activating disk brakes 34, air-bags 35 are disabled from dampening vibration. However, during the stripping process it may be desirable to have a slight amount of vibration in the compression beam to help pry the molded concrete product from mold assembly 86.

Various vibration patterns are used to increase the desired homogeneous composition of the formed cement products. One vibration scheme starts mold vibration a certain delay period after the feed drawer 52 begins dispensing concrete material into mold assembly 86. Vibration is continued throughout the time when feed drawer 52 is dispensing concrete into mold assembly 86 and throughout the compression stage while compression beam 26 is compressing the concrete material in mold assembly 86.

Alternatively, vibration can be discontinued after the mold assembly 86 has been filled with concrete material. Vibration system 115 is shut off while the feed drawer is moved away from mold assembly 86 and while the compression beam moves shoes 88 into the mold cavities. The vibration system 115 is then restarted for the compression stage. This vibration scheme prevents segregation or migration of material in the mold assembly 86.

For example, in prior vibration schemes, mold assembly 86 is filled with concrete material and vibration continued before the shoes 88 begin pressing against the top of the concrete material. If the concrete material is sitting freely and vibrating at the same time, large particles of the concrete material tend to move to the top of the mold assembly 86 and small particles tend to move towards the bottom of the mold assembly 86. This migration effect prevents a homogeneous mixture in the concrete material. By stopping the vibration system 115 immediately after filling the mold assembly 86, there is less migration in the concrete material. Vibration is then restarted after the shoes 88 make contact with the top of the concrete material. This allows the particles in the concrete material to be guided together making a dense more homogeneous mass.

Having described and illustrated the principles of the invention in a preferred embodiment thereof, it should be apparent that the invention can be modified in arrangement and detail without departing from such principles. I claim all modifications and variation coming within the spirit and scope of the following claims.

We claim:

1. An apparatus for forming concrete products comprising:

a frame for supporting product forming apparatus;

a mold box having internal cavities contoured to define preselected product patterns;

a shelf for mounting said mold box on said frame;

a feed box for receiving concrete material and selectively dispensing the concrete material into the mold box cavities; and multiple telescoping legs attached to the feed box, the legs extendable and retractable in unison for varying the vertical displacement of the feed means above the mold box.

2. An apparatus according to claim 1 including at least one motor mechanically coupled to the telescoping legs for selectively extending and retracting the legs in the same time in the same direction.

3. An apparatus for forming concrete products comprising:

a frame for supporting product forming apparatus;

a mold box having internal cavities contoured to define preselected product patterns;

mounting means for mounting said mold box on said frame;

feed means for receiving concrete material and selectively dispensing the concrete material into the mold box cavities; and support means attached to the feed means for varying the vertical displacement of the feed means above the mold box, the support means comprising multiple telescoping legs each having an interior tube that is vertically displaceable inside an associated exterior tube.

4. An apparatus according to claim 3 including multiple jack screws each rotatable about an associated vertical axis for vertically extending and retracting the interior tubes of said telescoping legs.

5. An apparatus according to claim 4 including leg drive means mechanically coupled to each jack screw for simultaneously controlling the rotation speed and rotation direction of each jack screw.

6. An apparatus according to claim 3 including locking means for locking each telescoping leg into a given vertical position.

7. An apparatus according to claim 6 wherein the locking means include a horizontally displaceable puck attached to an air-bag, the air-bag in an actuated condition extending the puck through a hole in the exterior tube clamping the puck against the associated interior tube.

8. An apparatus for forming concrete products, comprising:

a mold box having internal cavities contoured to define preselected product patterns, the mold box including a head assembly having shoes that insert into associated cavities in a mold assembly:

a frame including an upper beam vertically displaceable into a raised position that holds the head assembly shoes above the mold assembly;

mounting means for mounting said mold box on said frame;

feed means for receiving concrete material and selectively dispensing the concrete material into the mold box cavities;

support means attached to the feed means for varying the vertical displacement of the feed means above the mold box: and a brush located on the feed means for removing concrete material from the shoes while the upper beam is located in the raised position.

9. An apparatus for forming concrete products, comprising:

a mold box having internal cavities contoured to define preselected product patterns, the mold box including a head assembly having shoes that insert into associated cavities in a mold assembly;

a frame including an upper beam vertically displaceable into a raised position that holds the head assembly shoes above the mold assembly;

mounting means for mounting said mold box on said frame;

feed means for receiving concrete material and selectively dispensing the concrete material into the mold box cavities:

support means attached to the feed means for varying the vertical displacement of the feed means above the mold box: and a wiper bar attached to the feed means for scraping concrete material off a top surface of the mold assembly into the internal cavities of the mold box.

10. An apparatus for forming concrete products, comprising:

a mold box including a head assembly having shoes and a mold assembly having cavities for receiving the shoes;

a frame vertically displaceable into a raised position that holds the head assembly shoes above the mold assembly;

mounting means for mounting said mold box on said frame;

feed box for receiving concrete material and selectively dispensing the concrete material into the mold box cavities; and a wiper bar for scraping concrete material off a top surface of the mold assembly into the internal cavities of the mold box.

11. An apparatus for forming concrete products, comprising:

a mold box having internal cavities contoured to define preselected product patterns, the mold box including a head assembly having shoes that insert into associated cavities in a mold assembly;

a frame including an upper beam vertically displaceable into a raised position that holds the head assembly shoes above the mold assembly;

a feed box for receiving concrete material and selectively dispensing the concrete material into the mold box cavities; and a brush located on the feed box for removing concrete material from the shoes while the upper beam is located in the raised position.

* * * * *